(12) United States Patent
Bauerle et al.

(10) Patent No.: US 11,407,204 B2
(45) Date of Patent: Aug. 9, 2022

(54) LAMINATED GLAZING WITH AN ELECTRICALLY CONTROLLABLE DEVICE AND MANUFACTURE

(71) Applicant: SAINT-GOBAIN GLASS FRANCE, Courbevoie (FR)

(72) Inventors: Pascal Bauerle, Davenescourt (FR); Stephan Gillessen, Alsdorf (DE); Jean-Jacques Bris, Bey (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 133 days.

(21) Appl. No.: 16/966,361

(22) PCT Filed: Jan. 29, 2019

(86) PCT No.: PCT/FR2019/050197
§ 371 (c)(1),
(2) Date: Jul. 30, 2020

(87) PCT Pub. No.: WO2019/150037
PCT Pub. Date: Aug. 8, 2019

(65) Prior Publication Data
US 2020/0369007 A1     Nov. 26, 2020

(30) Foreign Application Priority Data
Jan. 31, 2018 (FR) ...................................... 1850775

(51) Int. Cl.
*B32B 17/10* (2006.01)
*B32B 3/26* (2006.01)
(Continued)

(52) U.S. Cl.
CPC ........ *B32B 17/10541* (2013.01); *B32B 3/266* (2013.01); *B32B 7/12* (2013.01);
(Continued)

(58) Field of Classification Search
CPC ........ B32B 17/10541; B32B 17/10036; B32B 17/10293; B32B 17/10385;
(Continued)

(56) References Cited

U.S. PATENT DOCUMENTS

| 5,066,525 A | 11/1991 | Nakamachi et al. |
| 5,137,954 A * | 8/1992 | DasGupta ......... B32B 17/10761 524/297 |

(Continued)

FOREIGN PATENT DOCUMENTS

| DE | 10 2005 007427 A1 | 8/2006 |
| DE | 10 2005 049081 B3 | 6/2007 |

(Continued)

OTHER PUBLICATIONS

International Search Report as issued in International Patent Application No. PCT/FR2019/050197, dated May 29, 2019.

*Primary Examiner* — Michael M. Bernshteyn
(74) *Attorney, Agent, or Firm* — Pillsbury Winthrop Shaw Pittman LLP

(57) ABSTRACT

A laminated glazing incorporates an electrically controllable device and the manufacture thereof including an operation of preassembly with a thin plastic strip.

22 Claims, 11 Drawing Sheets

(51) Int. Cl.
*B32B 7/12* (2006.01)
*B32B 27/30* (2006.01)
*B32B 37/06* (2006.01)
*B32B 37/10* (2006.01)
*B32B 37/12* (2006.01)
*B32B 37/18* (2006.01)
*B60J 1/00* (2006.01)
*B60J 1/02* (2006.01)
*B60K 35/00* (2006.01)
*B60Q 1/28* (2006.01)

(52) U.S. Cl.
CPC .. *B32B 17/10036* (2013.01); *B32B 17/10293* (2013.01); *B32B 17/10385* (2013.01); *B32B 17/10495* (2013.01); *B32B 17/10504* (2013.01); *B32B 17/10513* (2013.01); *B32B 17/10761* (2013.01); *B32B 17/10871* (2013.01); *B32B 17/10935* (2013.01); *B32B 27/30* (2013.01); *B32B 37/06* (2013.01); *B32B 37/1009* (2013.01); *B32B 37/12* (2013.01); *B32B 37/182* (2013.01); *B60J 1/001* (2013.01); *B60J 1/02* (2013.01); *B60K 35/00* (2013.01); *B60Q 1/28* (2013.01); *B32B 2305/34* (2013.01); *B32B 2305/345* (2013.01); *B32B 2305/55* (2013.01); *B32B 2307/202* (2013.01); *B32B 2307/412* (2013.01); *B32B 2315/08* (2013.01); *B32B 2329/06* (2013.01); *B32B 2457/00* (2013.01); *B32B 2457/202* (2013.01); *B32B 2551/00* (2013.01); *B32B 2590/00* (2013.01); *B32B 2605/006* (2013.01); *B32B 2605/08* (2013.01); *B60K 2370/1529* (2019.05); *B60K 2370/785* (2019.05); *B60Q 2400/10* (2013.01)

(58) Field of Classification Search
CPC ........ B32B 17/10495; B32B 17/10504; B32B 17/10513; B32B 17/10761; B32B 17/10871; B32B 17/10935; B32B 3/266; B32B 7/12; B32B 27/30; B32B 37/06; B32B 37/1009; B32B 37/12; B32B 37/192; B60J 1/001; B60J 1/02; B60K 35/00; B60K 2370/1529; B60K 2370/785; B60Q 1/28
USPC ...................................... 428/1.55
See application file for complete search history.

(56) References Cited

U.S. PATENT DOCUMENTS

| | | | |
|---|---|---|---|
| 6,327,089 B1 * | 12/2001 | Hosaki | B32B 17/10036 428/37 |
| 2009/0046355 A1 | 2/2009 | Derda | |
| 2015/0146286 A1 | 5/2015 | Hagen et al. | |
| 2015/0323716 A1 | 11/2015 | Greb et al. | |
| 2015/0331296 A1 | 11/2015 | Mennig et al. | |
| 2017/0327031 A1 * | 11/2017 | Bauerle | B32B 17/10541 |
| 2019/0134954 A1 * | 5/2019 | Bauerle | B32B 17/10036 |

FOREIGN PATENT DOCUMENTS

| | | | | |
|---|---|---|---|---|
| DE | 10 2007 027296 A1 | 12/2008 | | |
| DE | 10 2013 001334 A1 | 7/2014 | | |
| EP | 0 844 075 A1 | 5/1998 | | |
| EP | 0 990 941 A2 | 4/2000 | | |
| EP | 990941 A2 * | 4/2000 | ....... | B32B 17/10018 |
| FR | 3 044 972 A1 | 6/2017 | | |
| FR | 3 046 376 A1 | 7/2017 | | |
| WO | WO 2010/091742 A1 | 8/2010 | | |
| WO | WO 2011/161391 A1 | 12/2011 | | |
| WO | WO 2012/025685 A1 | 3/2012 | | |
| WO | WO 2012/045973 A1 | 4/2012 | | |
| WO | WO 2013/175101 A1 | 11/2013 | | |
| WO | WO 2015/031594 A2 | 3/2015 | | |
| WO | WO 2015/066201 A1 | 5/2015 | | |
| WO | WO 2015/079159 A1 | 6/2015 | | |
| WO | WO 2016/079459 A1 | 5/2016 | | |
| WO | WO-2016079459 A1 * | 5/2016 | ....... | B32B 17/10036 |
| WO | WO 2017/103425 A1 | 6/2017 | | |
| WO | WO 2017/103426 A1 | 6/2017 | | |
| WO | WO 2017/115040 A1 | 7/2017 | | |
| WO | WO 2017/115041 A1 | 7/2017 | | |
| WO | WO 2017/115042 A1 | 7/2017 | | |
| WO | WO 2017/115043 A1 | 7/2017 | | |
| WO | WO 2017/203132 A1 | 11/2017 | | |
| WO | WO 2017/203170 A1 | 11/2017 | | |
| WO | WO 2017/203171 A1 | 11/2017 | | |
| WO | WO 2017/203175 A1 | 11/2017 | | |
| WO | WO-2017203132 A1 * | 11/2017 | ....... | B32B 17/10036 |
| WO | WO-2017203170 A1 * | 11/2017 | ............. | B32B 17/10 |
| WO | WO-2017203171 A1 * | 11/2017 | ....... | B32B 17/10005 |
| WO | WO 2018/002707 A1 | 1/2018 | | |
| WO | WO 2018/002723 A1 | 1/2018 | | |
| WO | WO 2018/078278 A1 | 5/2018 | | |

* cited by examiner

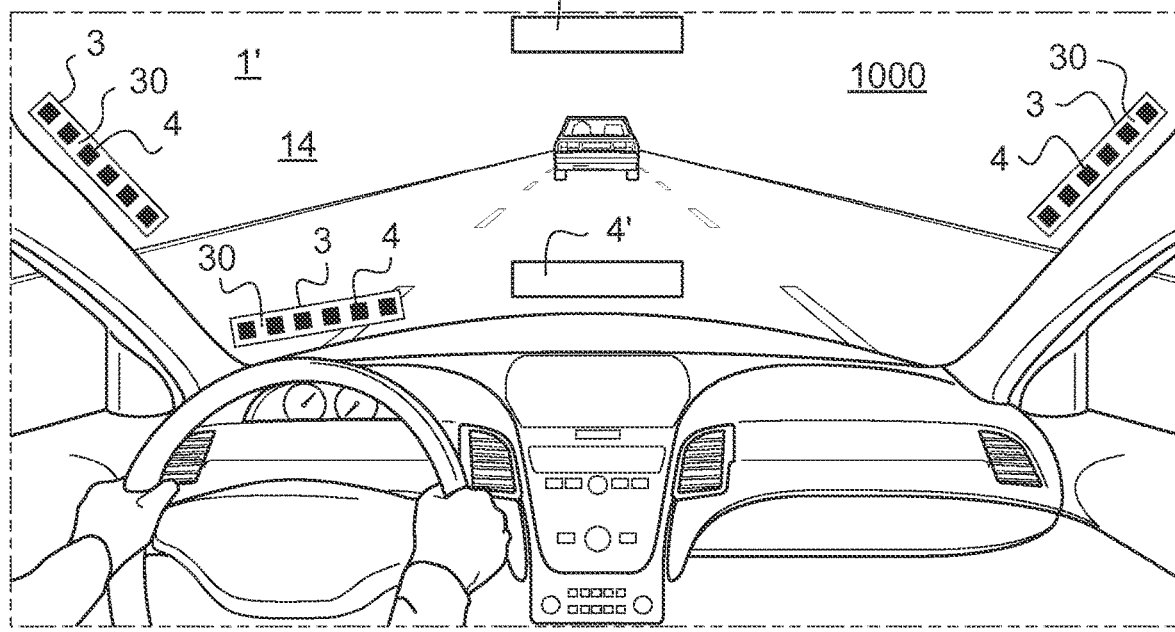
Fig.1
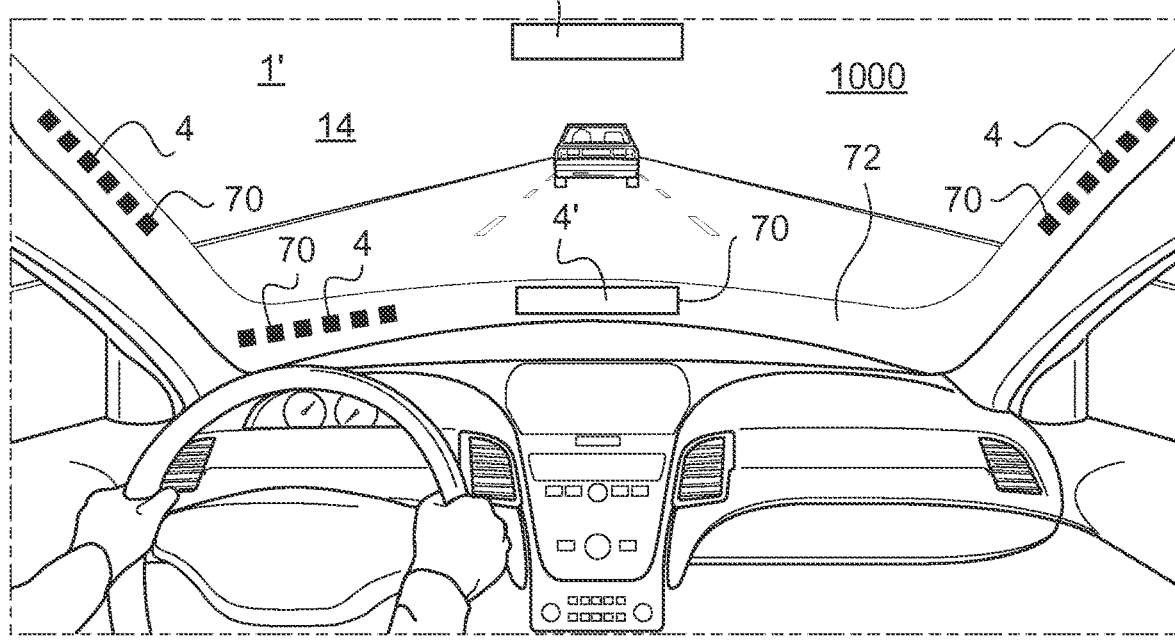
Fig.1bis

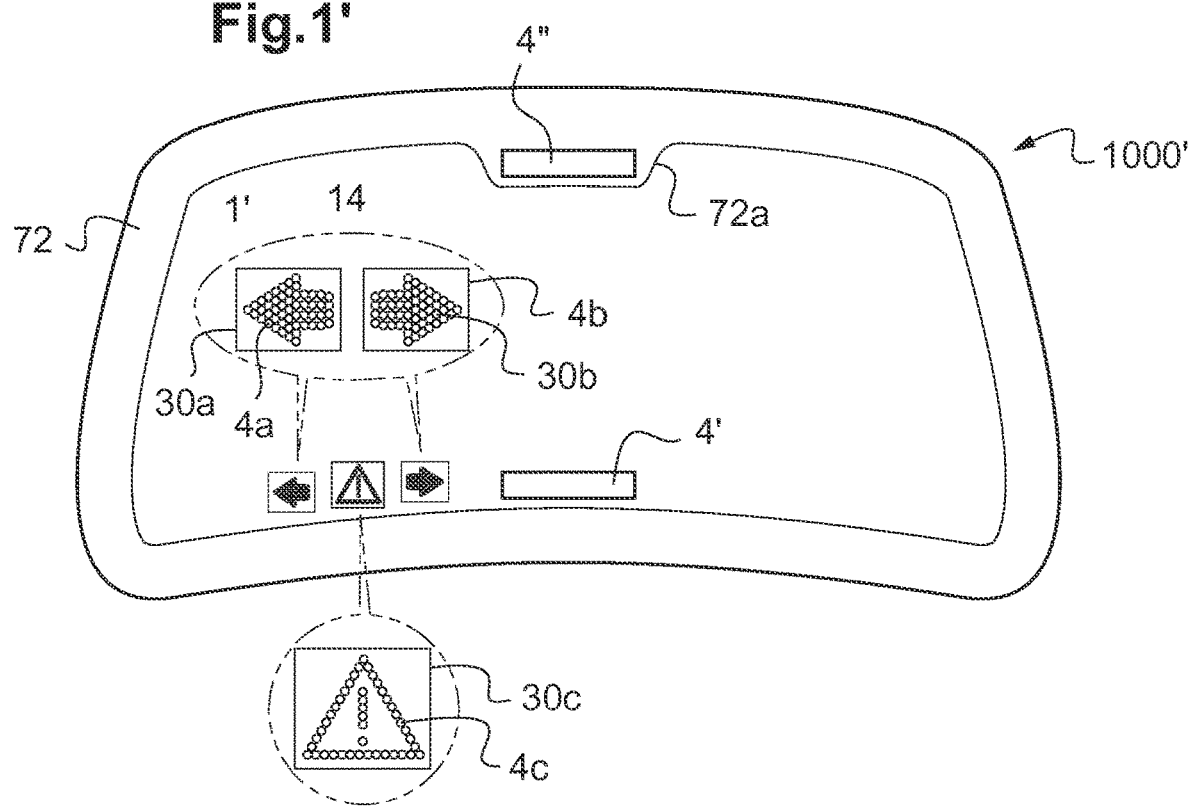
Fig.1'
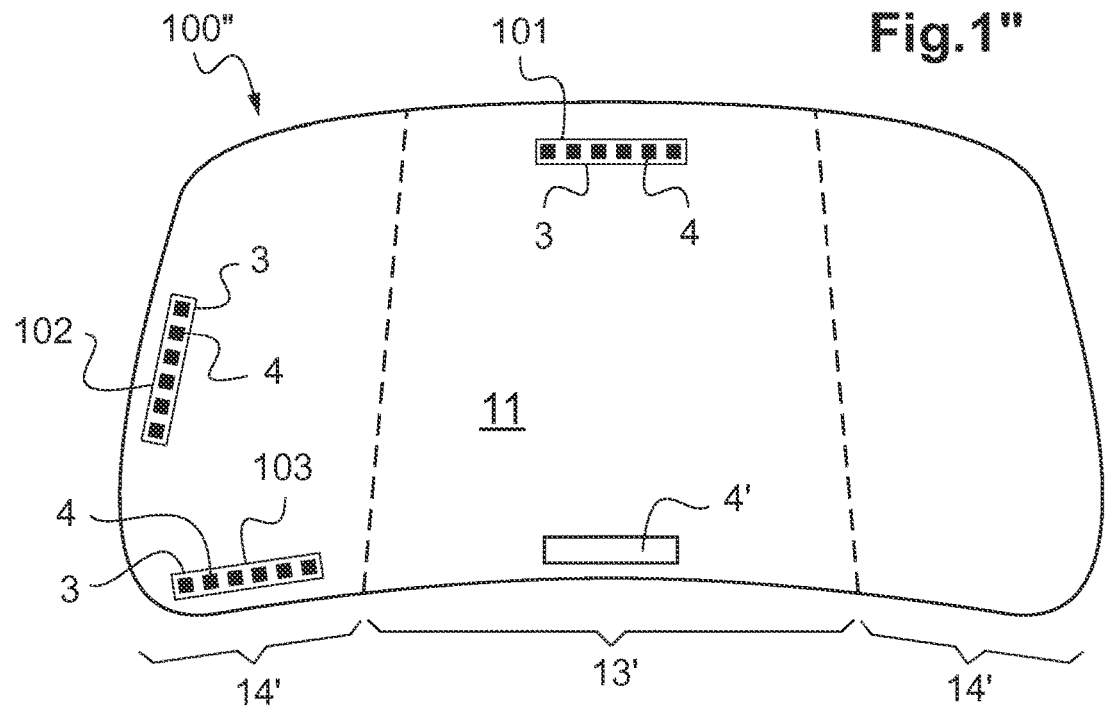
Fig.1"

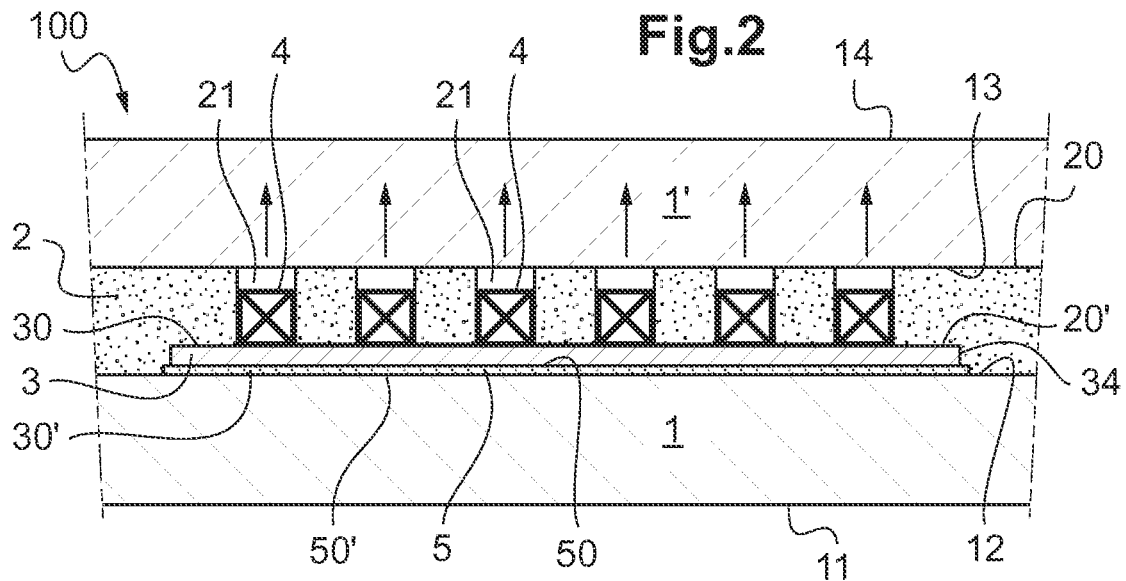
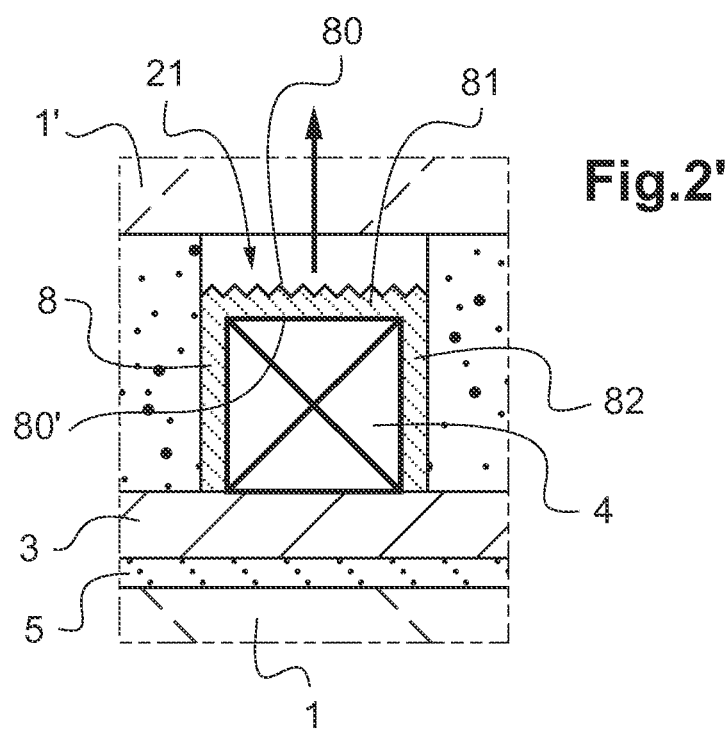

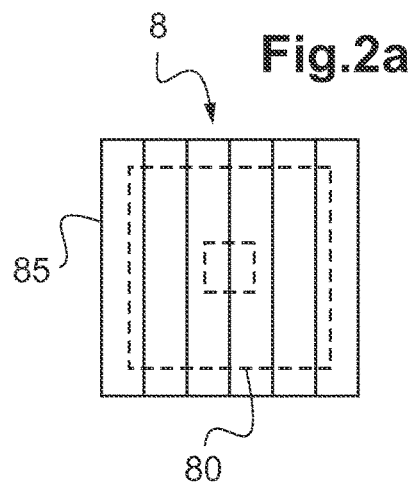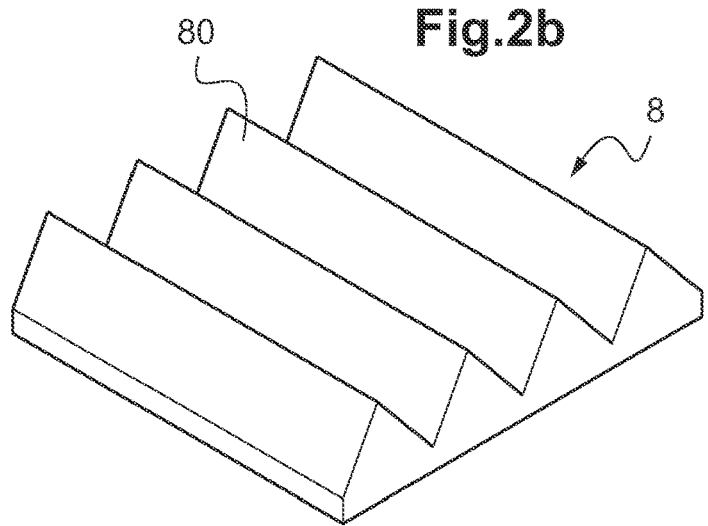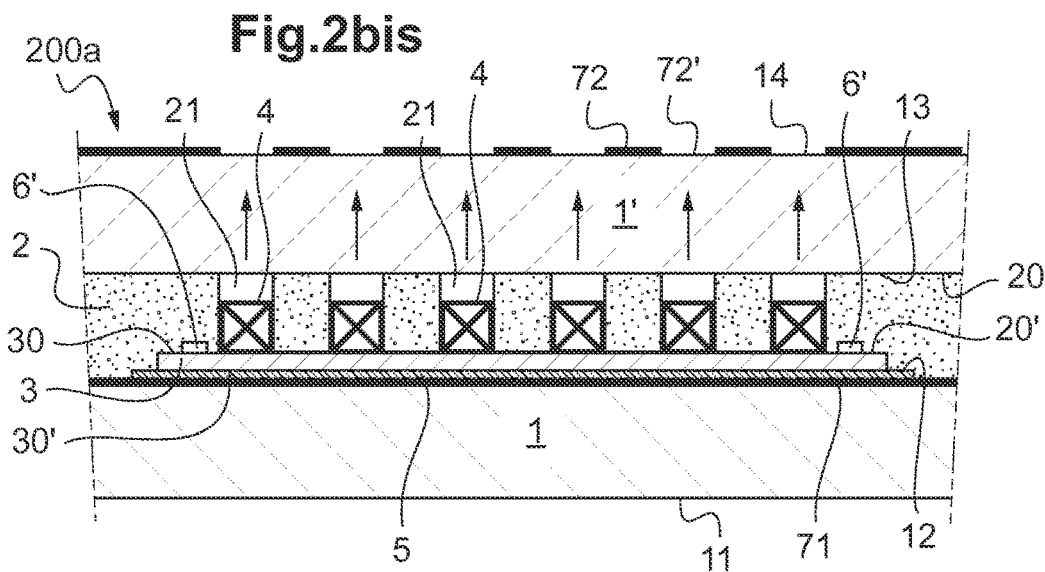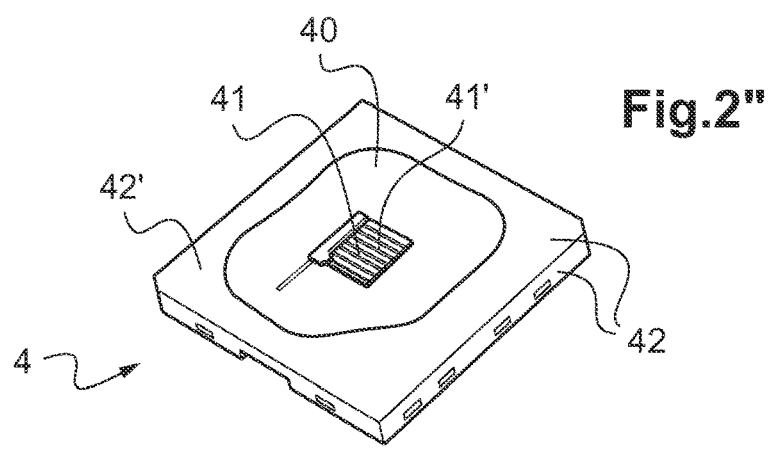

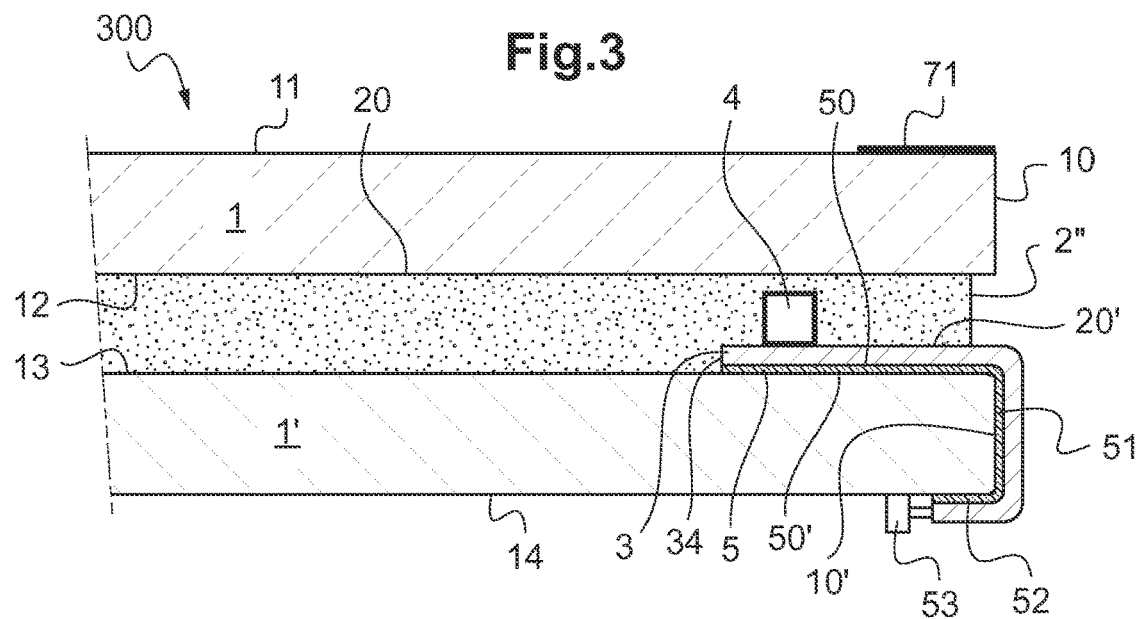
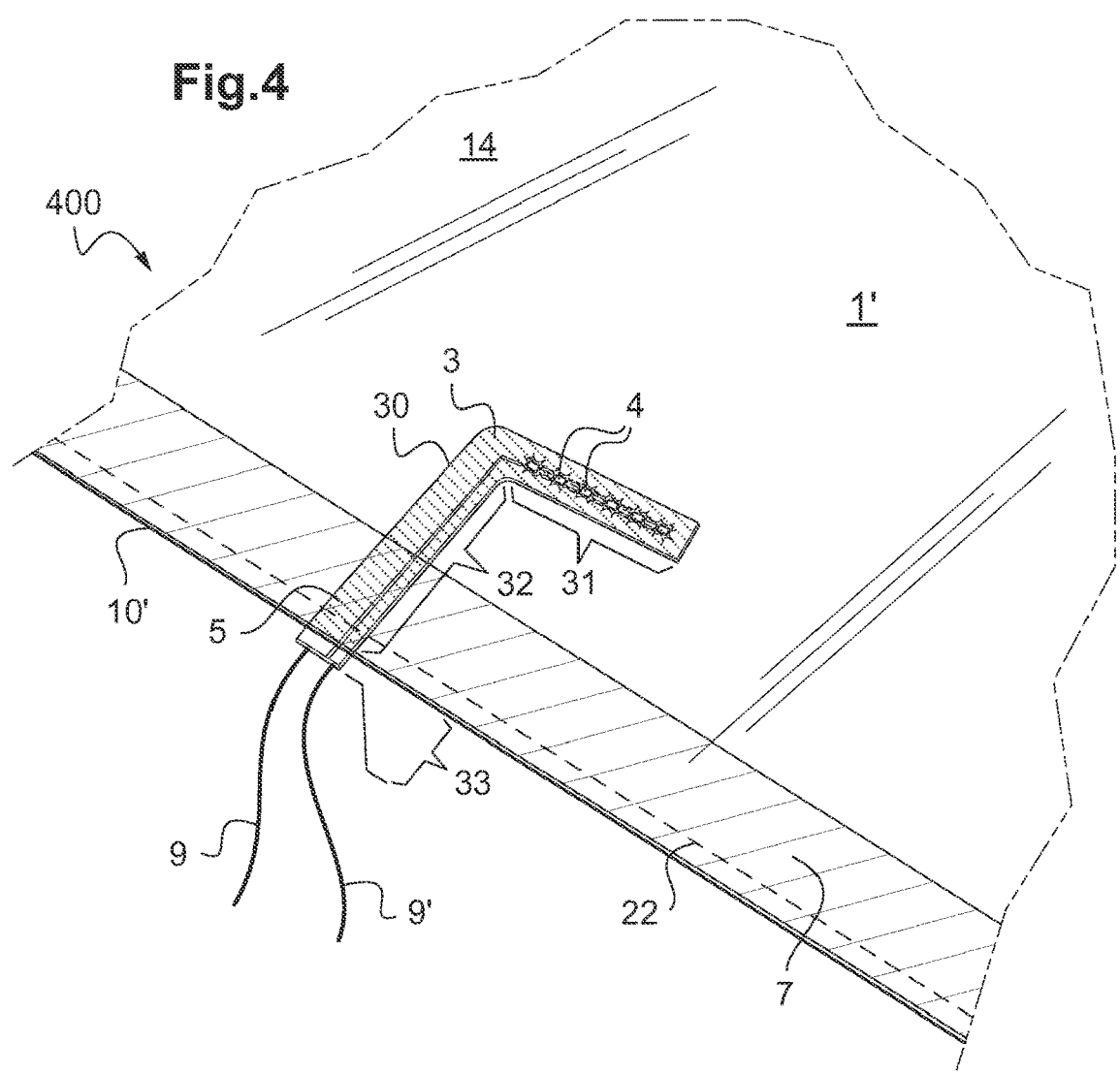

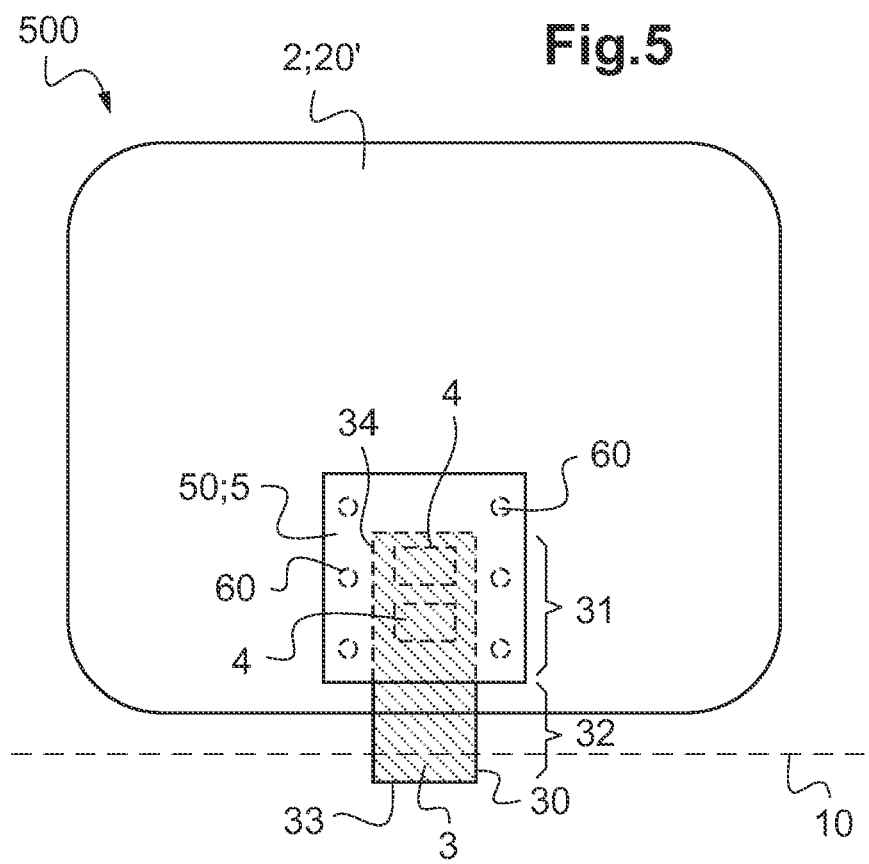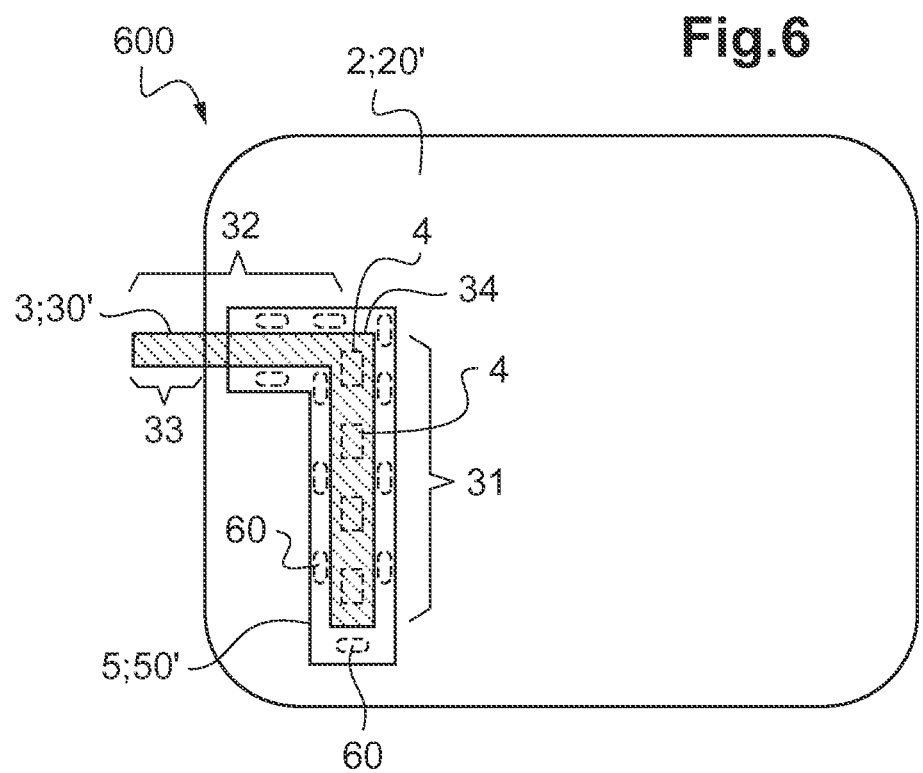

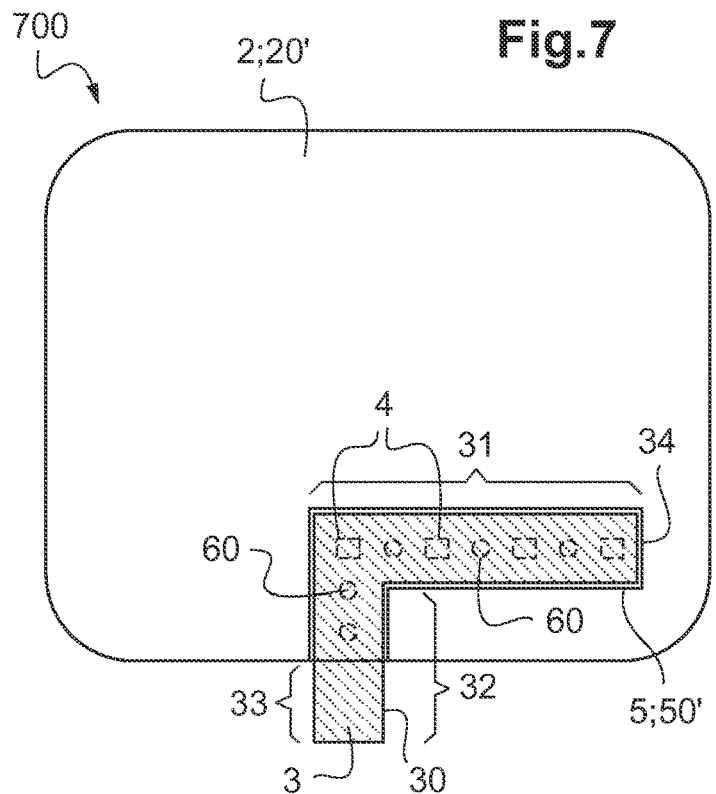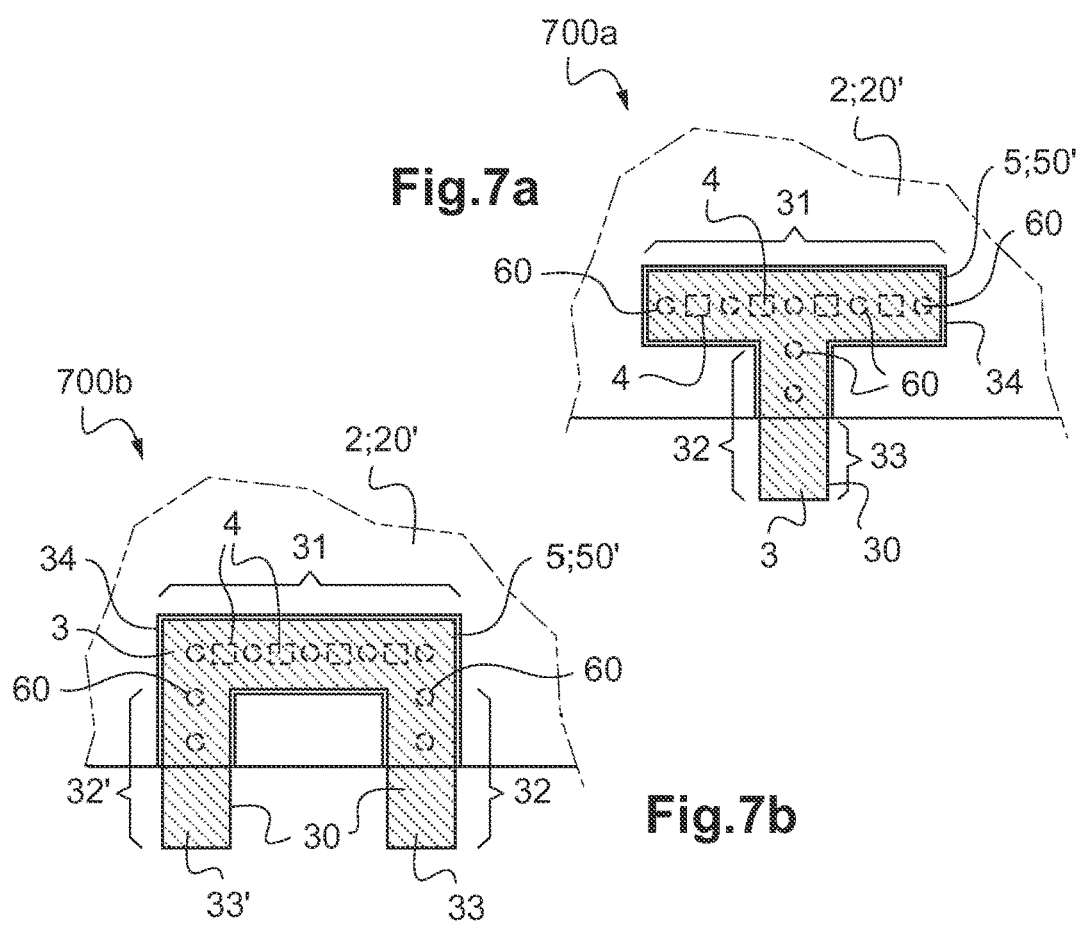

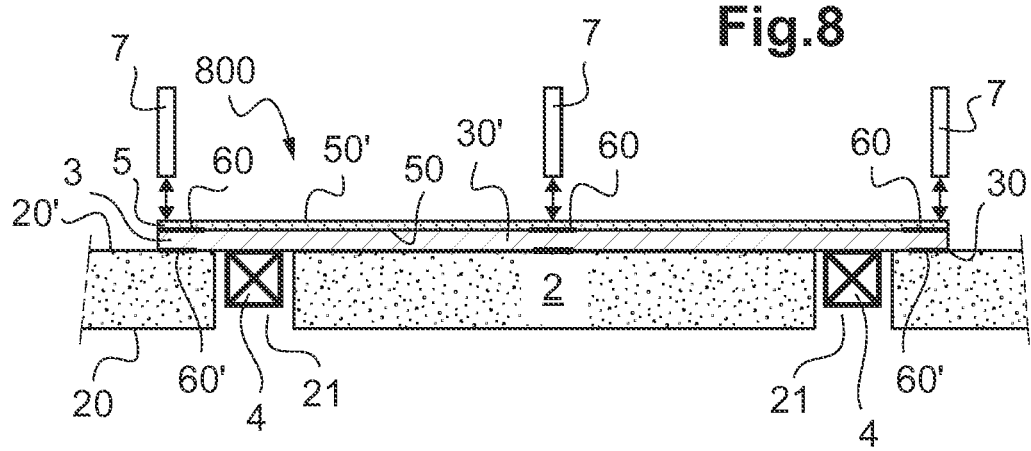
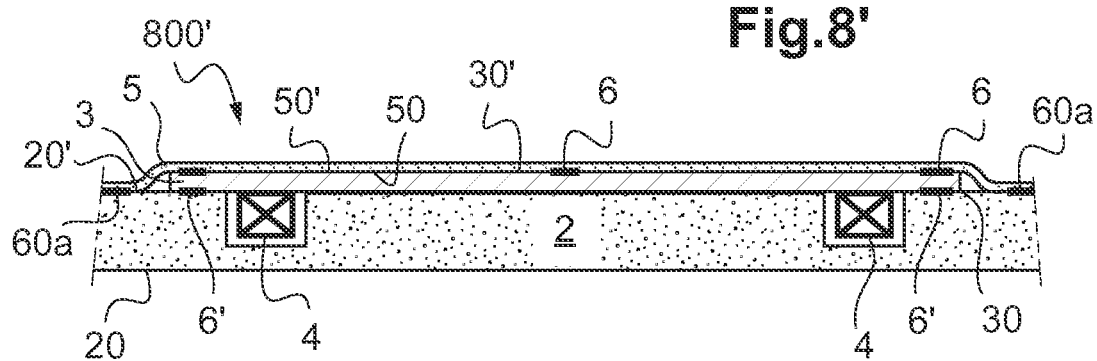

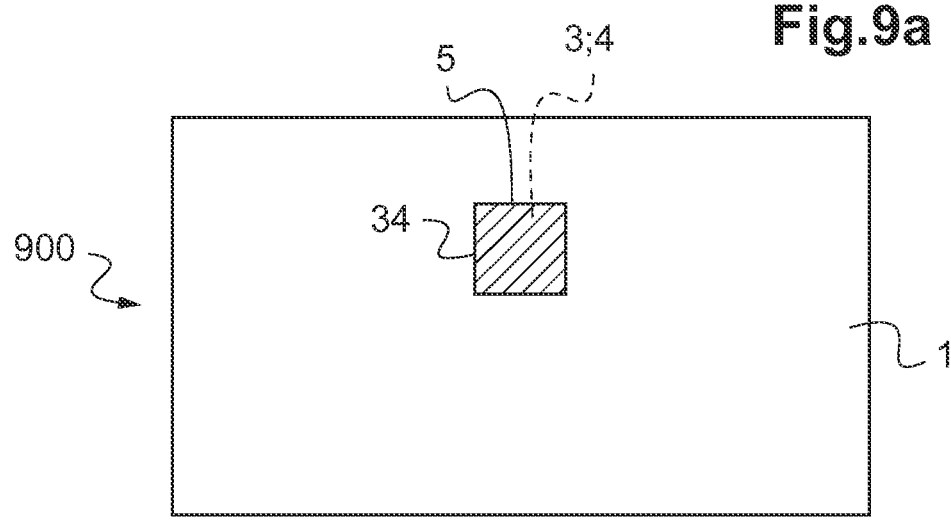
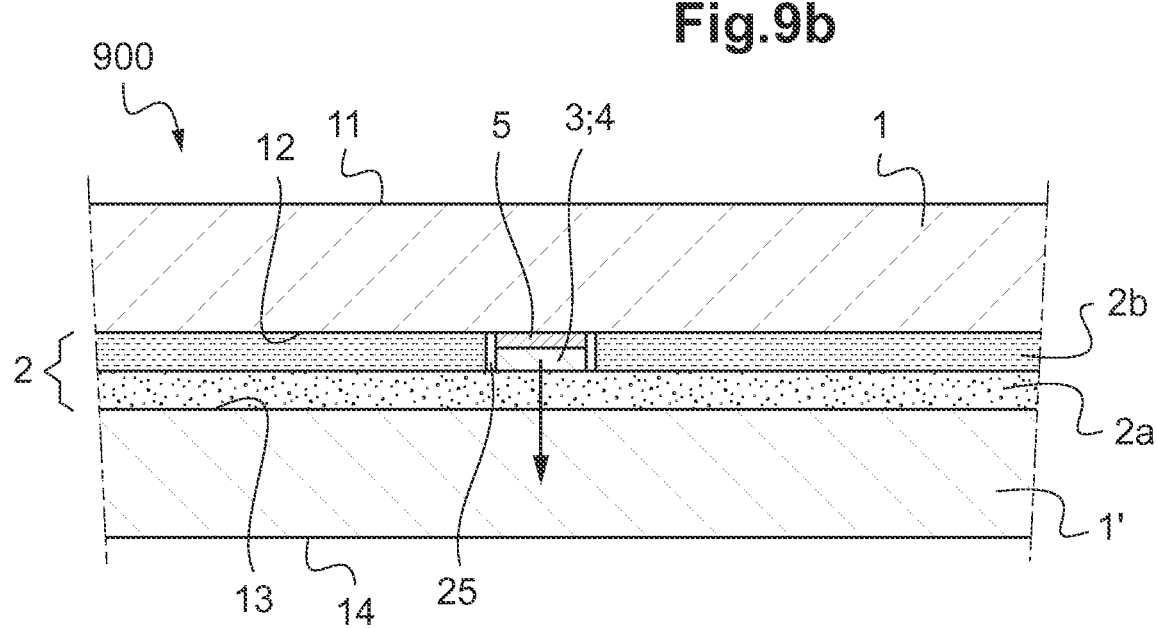

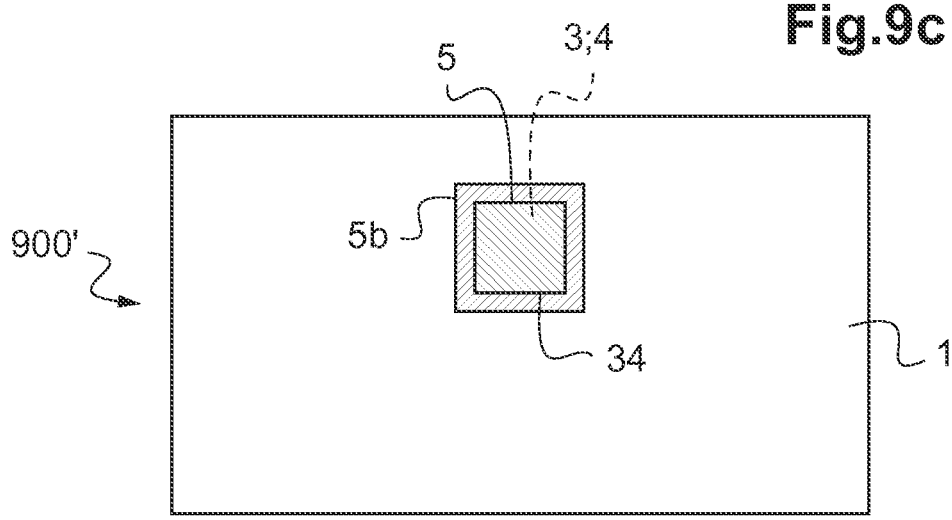
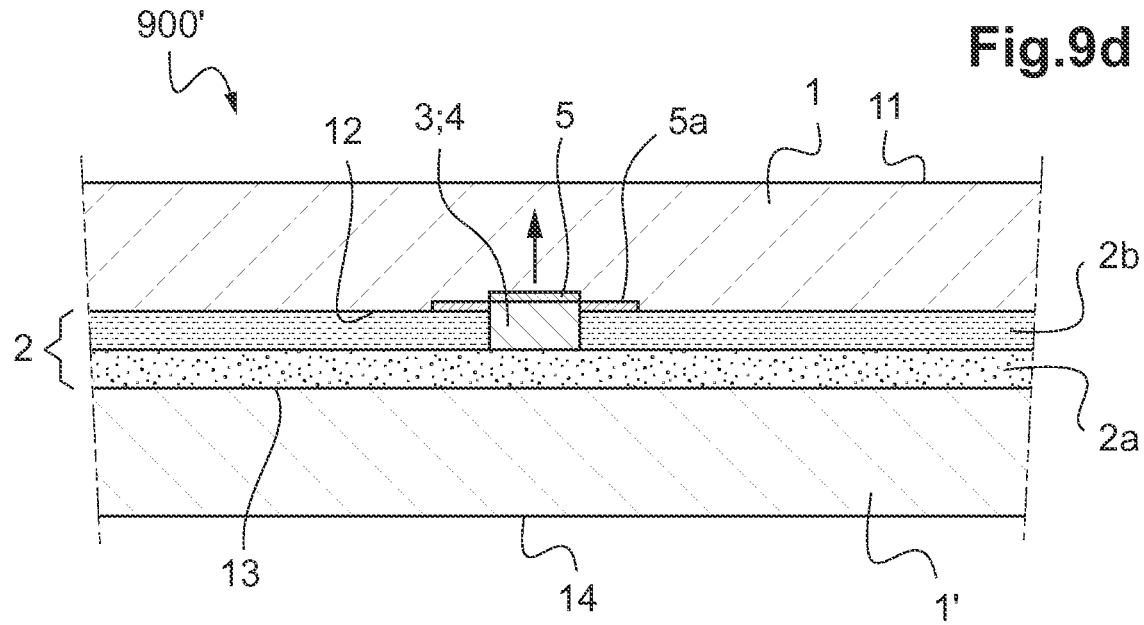

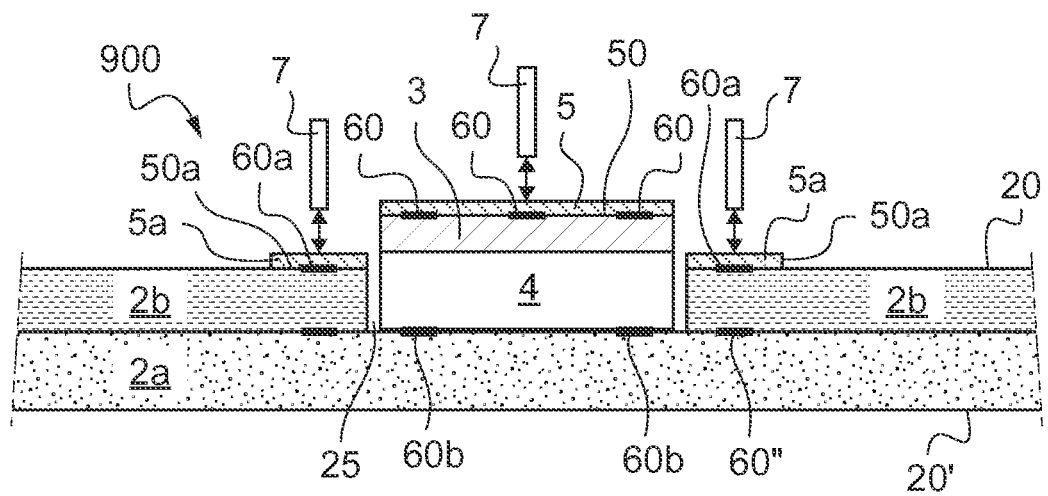
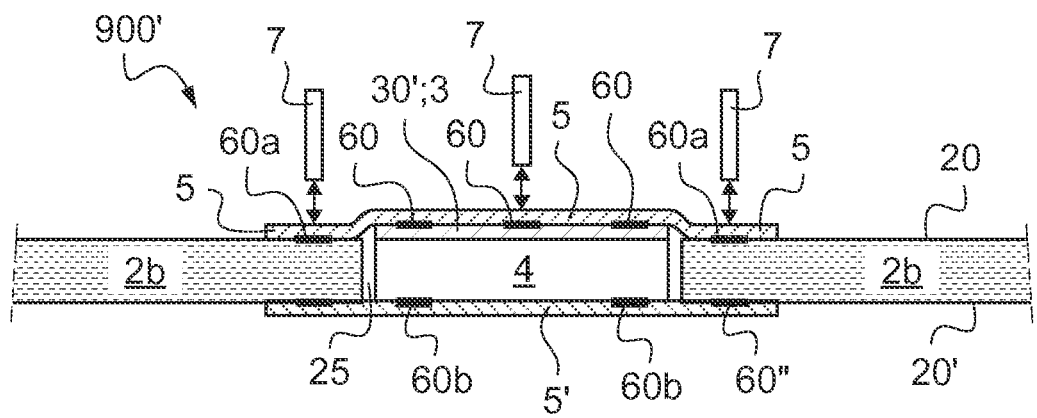

LAMINATED GLAZING WITH AN ELECTRICALLY CONTROLLABLE DEVICE AND MANUFACTURE

CROSS-REFERENCE TO RELATED APPLICATIONS

This application is the U.S. National Stage of PCT/FR2019/050197, filed Jan. 29, 2019, which in turn claims priority to French patent application number 1850775 filed Jan. 31, 2018. The content of these applications are incorporated herein by reference in their entireties.

The invention relates to a laminated glazing incorporating an electrically controllable device and the manufacture thereof.

Automotive vehicle glazing increasingly incorporates the light-signaling or illumination function by means of inorganic light-emitting diodes.

Document WO2016079459 describes a luminous laminated glazing forming a front windshield of an automotive vehicle, integrating diodes on a printed circuit board (PCB) in order to deliver luminous signals to alert the driver.

More precisely, in the embodiment described with reference to FIG. 5 of this document, the luminous windshield comprises:
a laminated glazing comprising:
  a first glazing, forming an exterior glazing, with first and second main faces, referred to as F1 and F2;
  a lamination interlayer made of poly(vinylbutyral) (PVB)
  a second glazing, forming an interior glazing, with third and fourth main faces, referred to as F3 and F4,
the second and third faces being the internal faces of the laminated glazing;
  a set of diodes on a printed circuit board (PCB), said diodes being able to emit a red signaling light to warn the driver, each diode having an emitting face emitting in the direction of the interior glass on what is referred to as the front face of the PCB.
  on the back face of the PCB, a double-sided adhesive tape, the thickness of which is less than 0.05 mm, forming a connection between the glazing and the PCB.

The formation of bubbles in the double-sided adhesive tape or even haze of the (transparent) adhesive tape is observed, which may cause defects in appearance. The use of this double-sided adhesive tape is furthermore restrictive from a process point of view and it is easily contaminated, trapping dust, etc.

The manufacture of such a luminous laminated glazing for automotive vehicles or for any other application (interior or exterior construction, equipment, etc.) may thus be improved. More broadly, the manufacture of any laminated glazing incorporating a (discrete, surface, etc.) electrically controllable device may be improved.

As such, a first subject of the present invention is a process for manufacturing a glazing with an electrically controllable device, in particular for a vehicle comprising an, in particular curved, laminated glazing including:
  a first transparent glazing, made of in particular curved, optionally clear, extra-clear or tinted, in particular grey or green, and preferably curved mineral glass or plastic, often forming the exterior glazing, with first and second main faces, referred to as face F1 and face F2, respectively, each being bare or coated with a (transparent or opaque) in particular mineral layer (functional layer, single or multilayer, etc., in particular a layer having a thickness of at most 50 μm or even being submicron-sized), the thickness of which glazing, for an automotive glazing, is preferably at most 2.5 mm and even at most 2.2 mm, in particular 1.9 mm, 1.8 mm, 1.6 mm and 1.4 mm, or even at most 1.3 mm or at most 1 mm;
  a second transparent glazing, made of in particular curved, preferably clear, extra-clear or even tinted mineral glass or plastic, often forming the interior glazing, with third and fourth main faces, referred to as face F3 and face F4, respectively, in particular F3 and F4 each being bare or coated with a (transparent or opaque) in particular mineral layer (functional layer, single or multilayer, etc., in particular a layer having a thickness of at most 50 μm or even being submicron-sized), the thickness of which glazing, for an automotive glazing, is preferably less than that of the first glazing, even at most 2.2 mm, in particular 1.9 mm, 1.8 mm, 1.6 mm and 1.4 mm, or even at most 1.3 mm or at most 1 mm, the total thickness of the first and second glazings preferably being strictly less than 4 mm, or even less than 3.7 mm,
preferably at least one of the first and second glazings being made of mineral glass, in particular F1, F2, F3 and F4 each being bare or coated with a (transparent or opaque) in particular mineral layer (functional layer, single or multilayer, etc., in particular a layer having a thickness of at most 50 μm or even being submicron-sized);
  a lamination interlayer made of thermoplastic polymer material, in particular made of one or more sheets, in particular having a main face FA making adhesive contact with the (bare or coated) second face F2 and a main face FB making adhesive contact with (bare or coated) face F3, and in particular having a thickness e1 that is subcentimeter-sized, preferably the majority of face F2 and of face F3 makes adhesive contact with the lamination interlayer, for an automotive glazing where e1 is preferably at most 1.8 mm, better at most 1.2 mm and even at most 0.9 mm (and better at least 0.3 mm and even at least 0.5 mm), in particular set back from the edge of the first glazing by at most 2 mm and set back from the edge of the second glazing by at most 2 mm,
preferably at least one of the first and second glazings being made of mineral glass and the laminated glazing comprising between the faces F2 and F3:
  an electrically controllable device, in particular an (elongate, for example square, rectangular, L-shaped, T-shaped, comb-shaped, etc.) strip, including a support, in particular an (elongate, for example square, rectangular, L-shaped, T-shaped, comb-shaped, etc.) strip, in particular having a width W2 of at most 1 m or at most 40 cm and even of at most 20 cm, 10 cm or 5 cm, having a thickness e2 that is in particular submillimeter-sized and even at most 0.15 mm, with a front face, a back face and an edge face, the front face bearing, in a zone referred to as the functional zone of an electrically controllable system having a thickness e'2 that is preferably submillimeter-sized, in particular having a width W2—that is in particular at most 5 cm or subcentimeter-sized (discrete component, etc.) or substantially equal to W2 (surface system), and the front face optionally including an electrical power supply zone adjacent to the functional zone, in particular opening out on or even with an extension protruding from the edge of the first or of the second glazing, the electrically controllable device having an area that is smaller than the lamination interlayer, the device therefore being in a (in particular peripheral) region of the glazing;

and the glazing including:

on the back face, in particular opposite the functional zone in particular provided with discrete (opto)electronic components or with a surface system, a polymer connecting element having a thickness e3 of at most 0.3 mm, 0.25 mm and even of at most 0.15 mm, in particular from 25 to 100 μm, 40 to 70 μm and even at most 50 μm, making adhesive contact with the back face and with one of the faces F2 and F3, referred to as the contact face (which may be bare or coated with the aforementioned said layer), in particular having a width W3 of at least 0.8 W2 or 0.9 W2 and/or of at most 1 m or of at most 40 cm and even of at most 20 cm, 10 cm or 5 cm, the connecting element preferably having an area smaller than a surface area of the lamination interlayer;

and/or front face side, on the front surface and/or on the front face, in particular the electrically controllable system in particular provided with discrete (opto)electronic components or surface system, another polymer connecting element having a thickness e'3 of at most 0.3 mm, 0.25 mm and even of at most 0.15 mm, in particular from 25 to 100 μm, 40 to 70 μm and even of at most 50 μm, making adhesive contact with the electrically controllable device and with one of the faces F2 and F3, then referred to as the contact face (which may be bare or coated with the aforementioned said layer), opposite the contact face in the case of two strips, the other connecting element preferably having an area smaller than a surface area of the lamination interlayer, in particular having a width W'3 of at least 0.8 W2 or 0.9 W2 and/or of at most 1 m or of at most 40 cm and even of at most 20 cm, the process including the following steps:

before lamination, providing a preassembled element including the electrically controllable device, said connecting element and/or the other connecting element and optionally at least one sheet of the lamination interlayer, referred to as the assembly sheet, the connecting element comprising a plastic, preferably thermoplastic, strip which has a main face, referred to as the connecting face $F_L$, facing the back face of the support, preferably in the functional zone and/or in the electrical power supply zone, in particular covering (primarily) the back face, which plastic strip is preferably set back by at most 5 mm, 2 mm or 1 mm from the edge face of the support, or flush with the edge face of the support or protruding from the edge face of the support (preferably over a limited zone), and the plastic strip having a free (nonbonding) main face F' opposite the connecting face $F_L$;

the connecting face $F_L$ making adhesive contact with or being bonded to the back face (the connecting face $F_L$ protruding from or not protruding from the edge face of the support);

and/or the connecting face $F_L$ protruding from the edge face of the support on at least one side (in particular at the border of the functional and/or electrical power supply zone in question), defining a protruding zone ZD facing a zone ZA of one of the main faces of the assembly sheet, the protruding zone ZD making adhesive contact with or being bonded to the zone ZA, ZA preferably being at most 10 cm, 5 cm or 1 cm from the edge face of the support, and even protruding on two, preferably opposite, sides, on three sides, around the periphery of the functional zone, etc. in particular with another protruding zone ZE facing a zone ZB of one of the main faces of the assembly sheet, for example ZD and ZE protruding from two opposite sides of the support, ZA and ZB preferably being at most 10 cm, 5 cm or 1 cm from the edge face of the support;

and/or the other connecting element comprising a plastic, preferably thermoplastic, strip which has a main face, referred to as the other connecting face $F'_L$, facing the front surface of the device, and the plastic strip having a free (nonbonding) main face F", opposite the other connecting face $F'_L$;

the other connecting face $F'_L$ making adhesive contact with or being bonded to the electrically controllable device (with/to the electrically controllable system, and/or with/to the front face), the other connecting face $F'_L$ protruding from or not protruding from the edge face of the support);

and/or the other connecting face $F'_L$ protruding from the edge face of the electrically controllable device (of the support) on at least one side defining another protruding zone Z'D facing another zone Z'A of one of the main faces of the assembly sheet, the other protruding zone Z'D making adhesive contact with or being bonded to the zone Z'A, Z'A preferably being at most 10 cm, 5 cm or 1 cm from the edge face of the support, and even protruding on two, preferably opposite, sides, on three sides, around the periphery of the functional zone, etc. in particular with another protruding zone Z'E facing a zone ZB of one of the main faces of the assembly sheet, for example Z'D and Z'E protruding from two opposite sides of the support, Z'A and Z'B preferably being at most 10 cm, 5 cm or 1 cm from the edge face of the support;

placing said preassembled element between the first and second glazings before, after or at the same time as the lamination interlayer is placed between the first and second glazings;

and the step of lamination with said preassembled element including an operation of placing under vacuum, or even an operation of placing under pressure, and a heating operation, the lamination step resulting in the (bare) free face $F_L$ being brought into (direct or indirect) adhesive contact with the, in particular bare or coated, contact face (resulting in the entire surface of the free face $F_L$ making adhesive contact with the contact face) and/or the (bare) free face $F'_L$ being brought into adhesive contact with the, in particular bare or coated, bonding face (resulting in the entire surface of the other free face $F_L$ making adhesive contact with the bonding face);

and in particular the lamination interlayer, in particular the assembly sheet (if applicable), being brought into adhesive contact with the faces F2 and F3 (in a distinct zone in particular adjacent to the zone with the electrically controllable device).

The double-sided adhesive tape used in the luminous laminated roof of the prior art requires the removal of a protective film (liner). Furthermore, the surface is sticky before positioning and hence does not allow the support to be easily readjusted if needed. Moreover, liner residue may cause bubbling or haze.

According to the invention, to simplify and accelerate the manufacture of the glazing, use is made of an element that is preassembled by bonding or adhesive contact out of the lamination line.

The plastic strip is therefore already connected (over the entire surface or at points of the surface) to the device and/or to the assembly sheet. In the latter case, the strip protrudes (it is larger than the device), the connection between the strip and the sheet possibly serving to hold the device by itself and there being no need for an additional back-face and plastic-strip connection.

The plastic strip is capable of bonding to the face of the glazing via the lamination. Unlike the double-sided adhesive tape, the free face of the thermoplastic strip is nonbonding and ready for use. The plastic strip according to the invention allows accurate positioning without wasting line time.

The manufacturing process is thus optimized and more compatible with automation.

The (thermo)plastic strip furthermore allows degassing (the escape of microbubbles arising in the degassing cycle in the drying oven), vacuum being used to remove the bubbles that are present before the temperature required for bonding the plastic (preferably thermoplastic) of the strip to the contact face is reached. The (thermo)plastic strip may thus be more transparent than the double-sided tape.

The thermoplastic strip may thus provide better mechanical strength, above all when the support is large.

The other plastic strip affords the same advantages as those mentioned above for the plastic strip.

It is possible to combine the one plastic strip and the other plastic strip, preferably with one protruding beyond the lamination interlayer, which is preferably a single, optionally apertured (PVB, PVB/functional PET/PVB, composite) sheet.

The other plastic strip may be apertured plumb with the discrete (opto)electronic components.

The plastic strip according to the invention is referred to in the text as the back plastic strip due to its connection to the back face.

The other plastic strip according to the invention is referred to in the text as the front plastic strip due to its position on the front face side. When the contact face is bare facing the connecting element, the connecting element (hence the plastic strip) makes direct adhesive contact with the contact face.

When the contact face is coated with a layer (a single or multilayer), in particular a functional layer (a masking, electrically conductive, low-emissivity, heating, etc. layer), facing the connecting element, the connecting element (hence the plastic strip) makes indirect adhesive contact with the contact face. A mineral layer is preferred. This is preferably a deposited layer, for example obtained by way of liquid deposition (screen printing, printing, etc.), physical vapour deposition (cathode sputtering) or even chemical deposition.

In particular, there is preferably no lamination interlayer (PVB, etc.) between the free main face F' and the contact face. One particular case is the insertion of another device between the free main face F' and the contact face, which may itself be preassembled, or housed in, covered by a lamination interlayer.

When the bonding face is bare facing the other connecting element, the other connecting element (hence the other plastic strip) makes direct adhesive contact with the bonding face.

When the bonding face is coated with a layer (a single or multilayer), in particular a functional layer (a masking, electrically conductive, low-emissivity, heating, etc. layer), facing the other connecting element, the other connecting element (hence the other plastic strip) makes indirect adhesive contact with the bonding face. A mineral layer is preferred. This is preferably a deposited layer, for example obtained by way of liquid deposition (screen printing, printing, etc.), physical vapour deposition (cathode sputtering) or even chemical deposition.

In particular, there is preferably no lamination interlayer (PVB, etc.) between the free main face F" and the bonding face. One particular case is the insertion of another device between the free main face F" and the bonding face, which may itself be preassembled, or housed in, covered by a lamination interlayer.

It is possible to adjust the shape of the plastic strip (or of the other plastic strip) suitably so as to use, for the sake of simplicity, a rectangular-, square-, L-, F-, E- or comb-shaped strip, in particular a strip in a shape similar to the support.

It is possible to envisage, after placement of the preassembled element and of the lamination interlayer (in particular, if applicable, the assembly sheet), bringing the preassembled element into point adhesive contact with the contact face and/or bringing the lamination interlayer (in particular, if applicable, the assembly sheet) into point adhesive contact with the contact face to hold it in place before placing it under vacuum.

The (local) electrically controllable device may partially cover the laminated glazing, for example by at most 50%, 40% or 30%, or even by at most 20% or 10%. Additionally, the (local) (thermo)plastic strip may partially cover the laminated glazing (for example by at most 50%, 40% or 30%, or even by at most 20% or 10%). The degree of coverage of the strip may preferably be identical to or slightly greater than that of the electrically controllable device.

The area of the lamination interlayer (the assembly sheet, etc.) is (much) larger than that of the (front or back) plastic strip, and may cover at least 70%, 80%, 90% or 95% of the glazing with an electrically controllable device. The lamination interlayer (the assembly sheet, etc.) may be set back from the edge face of the first glazing (and/or second glazing), in particular by at most 2 mm. When the support (and the strip) does not protrude from the first or second glazing, it is preferable for the lamination interlayer to surround the support (hence for the interlayer to be present between the support and the closest laminated glazing edge face).

A thin (front or back) plastic strip having an area that is smaller than the interlayer (than the assembly sheet) is thus preferred for optimizing cost and even for better handling during manufacture, given its thinness.

The (front or back) (thermo)plastic strip may protrude from the edge face of the support in the laminated glazing zone with the lamination interlayer, preferably by at most 20 cm, 10 cm or 5 cm, and even 1 cm from the edge face of the support, in order to facilitate placement (without folding, etc.), in particular if preassembly occurs between the back face and the (back) plastic strip.

In the present invention, the expression "at most X, Y or Z" means "at most X, (even) at most Y and (or even) at most Z".

According to one configuration, the (back) plastic strip is transparent (and free of defects) and/or the other (front) plastic strip is transparent, the support is transparent (the electrically controllable system is optionally transparent or at least allowing overall transparency), the placement of said preassembled element between the first and second glazings is in a transparent zone of the first and/or second glazing (face F2 and/or F3, which may be bare or coated with a transparent layer), the (back) transparent strip covering the back face at least opposite said functional zone and/or the other (front) plastic strip is transparent and covers said functional zone.

In one configuration, the process includes the formation of said preassembled element according to at least one of the following configurations (a) or b) or a)+b)):

a) assembling the connecting element (back plastic strip) together with the support, the connecting face $F_L$ being brought into adhesive contact with or bonded to the back face, the entire surface or points of the surface of which connecting face $F_L$ is/are brought into adhesive contact with the back face by means of an array of spaced point adhesive contacts or the entire surface or points of the surface of which connecting face $F_L$ is/are bonded to the back face via an array of spaced point adhesive contacts or else via an adhesive frame (bead of adhesive or double-sided adhesive tape, in particular of at most 100 µm in thickness), for example around the periphery, forming a seal, or by means of adhesive strips (bead of adhesive or double-sided adhesive tape), for example two peripheral strips;

a') assembling the other connecting element (front plastic strip), the other connecting face $F'_L$ being brought into adhesive contact with or bonded to the electrically controllable device (and/or the front face), the entire surface or points of the surface of which other connecting face $F'_L$ is/are brought into adhesive contact by means of an array of spaced point adhesive contacts or the entire surface or points of the surface of which other connecting face $F'_L$ is/are bonded via an array of spaced point adhesive contacts or else via an adhesive frame (bead of adhesive or double-sided adhesive tape, in particular of at most 100 µm in thickness), for example around the periphery, forming a seal, or by means of adhesive strips (bead of adhesive or double-sided adhesive tape), for example two peripheral strips;

b) and/or assembling the connecting element (back plastic strip) together with the lamination interlayer, points of the surface or the entire surface of the protruding zone ZD being brought into adhesive contact with the zone ZA by means of an array of spaced points adhesive contacts or the connecting face is bonded in particular via an array of point adhesive zones or its entire face to the zone ZA;

b') assembling the other connecting element (front plastic strip) together with the lamination interlayer, points of the surface or the entire surface of the other protruding zone Z'D being brought into adhesive contact with the zone Z'A by means of an array of spaced points adhesive contacts or the other connecting face is bonded via an array of point adhesive zones or its entire face to the zone Z'A.

All combinations, in particular a)+b); a')+b'); a)+b'); a')+b); a)+a'); b)+b'); a)+a')+b)+b'), are envisaged. This time it is possible to use a double-sided tape since the operation is outside the lamination line.

The adhesive contact, without the addition of adhesive material, is preferably achieved by softening the (back) plastic strip and/or the other (front) plastic strip, which are preferably made of thermoplastic, which results in adhesive contact between faces.

In particular and advantageously, the adhesive contact is achieved by means of heating and optionally also by means of pressure, in particular by means of induction heating, by means of hot air, or by means of radiation (laser) or else by using a solvent such as alcohol.

In particular and advantageously, the adhesive contact is a point contact and achieved by means of local heating and optionally also by means of pressure, in particular by means of induction heating, by means of hot air, or by means of radiation (laser) or else by using a solvent such as alcohol.

Each point adhesive contact is for example at most 15 mm in width.

Each point adhesive bond is for example at most 15 mm in width.

By way of heating tool, in particular for local or multilocal heating (and better still for applying pressure) a metal stylus, a "soldering iron" with a flat end-fitting (and preferably with a (silicone, teflon, PTFE elastomer etc.) non-stick coating able to let the heat pass), one or more heating fingers or a hot air gun may be used.

The point adhesive contact may be achieved in one operation for all of the contacts. A heating tool that allows the various point adhesive spots to be produced in a single operation may be chosen.

Local heating may make it possible to achieve local adhesive contact not only between the (back) plastic strip and the backside support but also between the device and a sheet of the interlayer.

Local heating may be achieved through the application of a heating tool on the back face side and/or front face side. The back face side is preferred.

During said operation of preassembling together with the connecting element or together with said other connecting element, the electrically controllable device (the back face or the front face, respectively) is, for example, on a first sheet of the lamination interlayer, the face of the first sheet which is on the opposite side to said connecting element or to said other connecting element, and a second sheet of the lamination interlayer (in particular the assembly sheet) is on the first sheet, the local heating resulting in the first sheet being brought into point contact with the second sheet.

During said operation of preassembling together with the connecting element, the front surface of the electrically controllable device is on a first sheet of the lamination interlayer, in particular the assembly sheet, the local heating resulting in the front surface of the electrically controllable device being brought into point contact with said first sheet of the lamination interlayer.

In one configuration, the (thermo)plastic strip and said lamination interlayer make contact or are spaced before lamination, for example by at most 5 mm or 1 mm, and after lamination (by reflow) the (thermo)plastic strip and said lamination interlayer make continuous contact, without leaving space between the back face and contact face and/or the other plastic strip and said lamination interlayer are spaced before lamination and after lamination the other plastic strip and said lamination interlayer make continuous contact, without leaving space between the front surface of the device and the bonding face.

Preferably, the strip is thermoplastic, is based on (made of) poly(vinyl butyral) (PVB) containing less than 15% plasticizer by weight, preferably less than 10% by weight and even better less than 5% by weight and in particular without plasticizer, and in particular having a thickness e3 of at most 0.15 mm, in particular from 25 to 100 µm, 40 to 70 µm and even at most 50 µm. Furthermore, said lamination interlayer is based on poly(vinyl butyral) (PVB) with plasticizer, in particular with more than 15% conventional plasticizer by weight, and in particular having a thickness of at most 0.3 mm or even of at most 0.6 mm, and/or the other strip is thermoplastic, based on poly(vinyl butyral) (PVB) containing less than 15% plasticizer by weight, preferably less than 10% by weight and even better less than 5% by weight and in particular without plasticizer, and said lamination interlayer is preferably based on poly(vinyl butyral) (PVB) in particular containing more than 15% plasticizer by weight.

Preferably, the support is flexible, made of plastic, and better transparent, preferably made of polyester, in particular polyethylene terephthalate or made of polyimide, in particular from 25 to 150 µm and even from 50 to 100 µm in thickness. More broadly, the support may be made of plastic material (in particular thermoplastic, polyethylene terephthalate PET, polyethylene naphthalate PEN, polyethylene PE, poly(methyl methacrylate) PMMA, polydimethylsiloxane PDMS, polyamide, polyimide, polycrylate, polyester, polycarbonate, polysulfones, polyethersulfones or thermoplastic polyurethane).

If one or more local cut-outs are made in the support, the thermoplastic strip (the other thermoplastic strip) may be integral/entire or with the local cut-outs.

The glazing with an electrically controllable device may include one or more other electrically controllable devices which are spaced apart, each with one plastic strip (or the other plastic strip) or with a common plastic strip (or the other plastic strip), for example along part or all the way along the edge of the laminated glazing.

When the support takes the shape of an L, is doglegged, etc., the shape of the plastic strip (or the other plastic strip) may be adjusted correspondingly, or alternatively, for the sake of simplicity, a rectangular-, square-, etc. shaped strip may be used. For example, in this configuration with a rectangular strip and a first L-, F-, E- or comb-shaped support, the plastic strip (or the other plastic strip) may protrude substantially from the edge face of the first support in the direction of the closest edge of the first glazing.

The support may be sufficiently flexible (malleable) to adapt to the curvatures of the curved laminated glazing.

The support may be associated with a flat connector that extends as far as to the edge face of the glazing and that even extends beyond said edge face. A flexible connector that is able to adapt to the curvatures of the glazing, including a plastic, PEN or polyimide for example, is preferred. The width (dimension along the edge face) of the flat connector may be smaller than or equal to the dimension of the (diode) support, in particular along the edge face.

The (flexible) support may be local, for example cover less than 10% of the surface of the laminated glazing, in particular in a peripheral region of the laminated glazing (of the windshield).

After lamination, the, preferably flexible, support may include an an external electrical power supply portion extending up to the edge face of the laminated glazing and protruding from the edge face of the glazing and even folded over the face F4 (or F1) or the other plastic strip protrudes from the edge face of one of the first and second glazings and is folded over the face F4 (or F1).

Thus, before lamination, the (front or back) (thermo) plastic strip may protrude from the edge face of one of the first and second glazings and is folded over the face F4 or F1 by being preattached to the face F4 or F1 by means of adhesive tape and then removed after lamination.

In one embodiment, before the placement of said preassembled element together with the other connecting element, the lamination interlayer comprises a sheet, referred to as the back sheet, which is optionally said assembly sheet, with a main face F'x which is placed against the back face of the support, and the main face F'x optionally including said zone Z'A, the other plastic strip, referred to as the front plastic strip, is against the front face, and on the electrically controllable system which includes a set of discrete and thin components, preferably where e'2<0.15 mm, which front plastic strip optionally has through-holes plumb with the discrete components, and, after lamination, the back face makes adhesive contact with the back face, the faces F2 and F3 (outside the device zone) and preferably makes contact with the other plastic strip (front strip). In another embodiment, before the placement of said preassembled element together with the connecting element and optionally the other connecting element (before or after preassembly), the lamination interlayer comprises a (tinted, wedge-shaped, acoustic multilayer, wired, PVB/PET/PVB composite assembly) sheet, referred to as the front sheet, which is optionally said assembly sheet, with a main face Fx which is placed against the front surface of the electrically controllable device, in particular the front face of the support (above all with a discrete system such as an (opto)electronic component), and the main face Fx optionally including said zone ZA. After lamination, the front (in particular single) sheet (the face Fx) makes adhesive contact with the front surface of the device, in particular the bare or coated front face of the support, with the electrical circuit, etc.

When the lamination interlayer comprises a single sheet, the front sheet may make adhesive contact with (the majority of) the other of the faces F2 or F3 and with (the majority of) the contact face.

When the lamination interlayer comprises a second sheet on the face Fx side (in particular an apertured sheet with a slot for housing the device in particular), the second (apertured) sheet may make adhesive contact with (the majority of) the contact face and the front sheet may make adhesive contact with (the majority of) the other of the faces F2 or F3. The front sheet may have a blind slot in the zone of the electrically controllable device extending the slot of the second (apertured) sheet.

When the electrically controllable system is too thick but discrete (point device), it is possible to make, in the front sheet, a hole dedicated to the electrically controllable system, for example as described above for the diodes in the aforementioned prior art or more broadly for other electrically controllable systems ((opto)electronic components, etc.).

Thus, in a first configuration, the main face Fx of the front sheet includes at least one through- or blind hole, the width W1 of which is at most 20 mm, 15 mm, 10 mm, 5 mm or 2 mm and the length of which is even at most 10 mm, 5 mm or 2 mm, housing the, what is referred to as discrete, electrically controllable system, in particular an (opto)electronic component such as a photodiode or an inorganic diode, where e'2>0.15 mm (requiring the interlayer to be cut) and in particular submillimeter-sized, even at most 0.5 mm, the width W2 of which is at most 20 mm, 10 mm, 5 mm or 2 mm and the length of which is even at most 10 mm, 5 mm or 2 mm, and e2<0.15 mm and e3<0.15 mm.

The front sheet makes adhesive contact with the front face of the support. In particular, the hole is wider than the area of the electrically controllable system (optoelectronic component), preferably wider by at most 0.5 mm or even by at most 0.1 mm. Optionally, the hole is a through-hole and the optional other plastic strip between the bonding face and the front sheet covers each component in a through-hole.

Of course, the main face Fx of the front sheet may include as many holes as there are components on the support or even holes common to a plurality of components that are adjacent on the support.

The other plastic strip or front plastic strip (on the front surface) may be between the apertured sheet (through-hole) and the contact face, for example for protecting the front surface of the one or preferably more (optoelectronic) components, the sheet may extend beyond the edge face of the support.

In one embodiment with only the other plastic strip (front plastic strip), the sheet of the interlayer makes adhesive contact with the back face on the back face side. The other plastic strip (front plastic strip) is on the front face and on the components or includes holes that are plumb with the components so as to limit the number of interfaces.

The use of a thin plastic strip brings the components of the glazing (sensors, etc.) closer together, which may improve performance.

When the electrically controllable system is too thick but is a surface system (has a relatively large area), it is preferably housed in a through- or blind hole in a lamination interlayer sheet. Thus, in a second configuration, before the placement of said preassembled element (before or after preassembly) with said connecting element and/or the other connecting element, the lamination interlayer includes an apertured sheet (single sheet, composite sheet, etc.) thus including a (blind or through-) aperture housing all or part of the electrically controllable system and of the support (all or part between the glazings, at least the functional zone, and all or part of the electrical power supply zone between the glazings, preferably distinct from a recess, i.e. from an emergent peripheral aperture), and preferably even surrounding all or part of the edge face of the device, the apertured sheet having the main face Fx which is free and optionally including said zone ZA (oriented toward the contact face after placement) or F'x (oriented toward the bonding face after placement) and optionally including the zone Z'A, the (thermo)plastic strip faces the aperture, with a difference in height H1 between the face Fx and the free face of the plastic strip of at most 0.3 mm, 0.2 mm or 0.15 mm and/or the other plastic strip faces the aperture, with a difference in height H'1 between the face F'x and the free face $F'_L$ of the other plastic strip of at most 0.3 mm.

In particular, the free face of the plastic strip is below flush with the face by at most 0.3 mm, 0.2 mm or 0.15 mm, flush with the face Fx or emergent (exhibit overthickness) by at most 0.3 mm, 0.2 mm or 0.15 mm.

In particular, the free face of the other plastic strip is below flush with the face by at most 0.3 mm, 0.2 mm or 0.15 mm, flush with the face Fx or emergent (exhibit overthickness) by at most 0.3 mm, 0.2 mm or 0.15 mm.

In particular, before lamination with the preassembled element including the connecting element and/or the other connecting element, the electrically controllable device emerges from the apertured sheet (the back face of the support or the front surface), the electrically controllable device and the main face Fx are spaced apart by a nonzero height H2 that is greater than e2 (and smaller than e2+e'2), H2 being at most 0.3 mm, 0.2 mm or 0.15 mm, and the back face being emergent from the apertured sheet. The process comprises the positioning of an additional plastic, preferably thermoplastic (and even plastic which is identical to said plastic strip on the back face), strip forming a frame over all or part of the edge face of the support, the thickness Ex of which is at most 0.15 mm and smaller than or equal to H2, and against the edge face of the support or spaced apart therefrom by at most 1/0.5 mm, and faces a zone of the apertured sheet.

The additional plastic strip has a free main face F''', opposite a connecting face FC, the additional plastic strip optionally includes a single strip or a plurality of stepped plastic strips and Ex is then the total thickness of the plastic strips and, by the lamination step, said free face of the other plastic strip is brought into adhesive contact with the contact face.

In particular, the connecting face FC may make adhesive contact with the apertured sheet before said preassembled element is placed between the first and second glazings, which adhesive contact is made by means of the tools already mentioned above for preassembly (softening, local heating, etc.). The hole or slot is for example blind in the first or second PVB.

In one configuration, for example for an automotive vehicle or building window or else furniture door (equipment, etc.), the first glazing is the external glazing, the first face is often referred to as face F1 and the second face is often referred to as face F2, and the second glazing is the internal glazing, the third face is often referred to as face F3 and the fourth face is often referred to as face F4.

In an alternative configuration, for example for an automotive vehicle or building window or else furniture door (equipment, etc.), the first glazing is the external glazing, the first face is often referred to as face F4 and the second face is often referred to as face F3, and the second glazing is the internal glazing, the third face is often referred to as face F2 and the fourth face is often referred to as face F1.

In one configuration:
the first and the second glazings are made of mineral glass;
the first glazing is made of mineral glass and the second glazing is made of plastic that is for example thinner (film), etc., for example made of PC, PMMA or PET;
the second glazing is made of mineral glass and the first glazing is made of plastic that is for example thinner (film), etc., for example made of PC, PMMA or PET.

The laminated glazing with an electrically controllable device according to the invention may form part of a double glazing (glazing on the exterior of the building or glazing on the interior of the building) or even of a triple glazing.

For the building, the laminated glazing may form part of a partition, of a door for equipment, of a window or of a roof.

Another subject of the invention is a glazing with an electrically controllable device obtained in particular according to the manufacturing process such as described above, comprising a laminated glazing including:
a first transparent glazing, made of in particular curved, optionally clear, extra-clear or tinted, in particular grey or green, and preferably curved mineral glass or plastic, often forming the exterior glazing, with first and second main faces, referred to as face F1 and face F2, respectively, each being bare or coated with a (transparent or opaque) in particular mineral layer (functional layer, single or multilayer, etc., in particular a layer having a thickness of at most 50 μm or even being submicron-sized), the thickness of which glazing, for an automotive glazing, is preferably at most 2.5 mm and even at most 2.2 mm, in particular 1.9 mm, 1.8 mm, 1.6 mm and 1.4 mm, or even at most 1.3 mm or at most 1 mm;
a second transparent glazing, made of in particular curved, preferably clear, extra-clear or even tinted mineral glass or plastic, often forming the interior glazing, with third and fourth main faces, referred to as face F3 and face F4, respectively, in particular F3 and F4 each being bare or coated with a layer (functional layer, single or multilayer, etc., in particular a layer having a thickness of at most 50 μm or even being submicron-sized), the thickness of which glazing, for an automotive glazing, is preferably less than that of the first glazing, even at most 2.2 mm, in particular 1.9 mm, 1.8 mm, 1.6 mm and 1.4 mm, or even at most 1.3 mm or at most 1 mm, the total thickness of the first and second glazings preferably being strictly less than 4 mm, or even less than 3.7 mm, preferably at least one of the first and second glazings being made of mineral glass, in particular F1, F2, F3 and F4 each being bare or coated with an, in particular mineral, layer (functional layer, single or multilayer, etc., in particular a layer having a thickness of at most 50 µm or even being submicron-sized);

a lamination interlayer made of thermoplastic polymer material, in particular made of one or more sheets, in particular having a main face FA making adhesive contact with the second face F2 and a main face FB making adhesive contact with face F3, and in particular having a thickness e1 that is subcentimeter-sized, preferably the majority of face F2 and of face F3 makes adhesive contact with the lamination interlayer, for an automotive glazing where e1 is preferably at most 1.8 mm, better at most 1.2 mm and even at most 0.9 mm (and better at least 0.3 mm and even at least 0.5 mm), in particular set back from the edge of the first glazing by at most 2 mm and set back from the edge of the second glazing by at most 2 mm, preferably at least one of the first and second glazings being made of mineral glass and the laminated glazing comprising, between the faces F2 and F3:

an electrically controllable device, in particular an (elongate, for example square, rectangular, L-shaped, T-shaped, comb-shaped, etc.) strip, including a support, in particular an (elongate, for example square, rectangular, L-shaped, T-shaped, comb-shaped, etc.) strip, in particular having a width W2 of at most 1 m or at most 40 cm and even of at most 20 cm, 10 cm or 5 cm, having a thickness e2 that is in particular submillimeter-sized and even at most 0.15 mm, with a front face, a back face and an edge face, the front face bearing, in a zone referred to as the functional zone of an electrically controllable system having a thickness e'2 that is preferably submillimeter-sized, in particular having a width W2 that is in particular at most 5 cm or subcentimeter-sized (discrete component, etc.) or substantially equal to W2 (surface system), and the front face optionally including an electrical power supply zone adjacent to the functional zone, in particular opening out on or even with an extension protruding from the edge of the first or of the second glazing, the electrically controllable device having an area that is smaller than the lamination interlayer, the device therefore being in a (in particular peripheral) region of the glazing;

on the back face, a polymer connecting element, which is a plastic strip having a thickness e3 of at most 0.3 mm, 0.25 mm and even of at most 0.15 mm, in particular from 25 to 100 µm, 40 to 70 µm and even at most 50 µm, making adhesive contact with the back face and with one of the faces F2 and F3, then referred to as the contact face, the area of the connecting element being smaller than that of the lamination interlayer, in particular having a width W3 of at least 0.8 W2 or 0.9 W2 and/or of at most 1 m or of at most 40 cm and even of at most 20 cm, 10 cm or 5 cm;

and/or on the front surface, another polymer connecting element, which is another plastic strip having a thickness e'3 of at most 0.3 mm, 0.25 mm and even of at most 0.15 mm, in particular from 25 to 100 µm, 40 to 70 µm and even at most 50 µm, making adhesive contact with the front surface and with one of the faces F2 or F3, then referred to as a bonding face, in particular having a width W3 of at least 0.8 W2 or 0.9 W2 and/or of at most 1 m or of at most 40 cm and even of at most 20 cm;

the other connecting element having an area smaller than a surface area of the lamination interlayer.

Preferably, one or more of the following features is provided:

the plastic strip is thermoplastic, based namely on poly(vinyl butyral) (PVB) containing less than 15% plasticizer by weight, preferably less than 10% by weight and even better less than 5% by weight and in particular without plasticizer, and said lamination interlayer is based on poly(vinyl butyral) (PVB) in particular containing more than 15% plasticizer by weight;

and/or the plastic strip is thermoplastic, based namely on poly(vinyl butyral) (PVB) containing less than 15% plasticizer by weight, preferably less than 10% by weight and even better less than 5% by weight and in particular without plasticizer, and said lamination interlayer is based on poly(vinyl butyral) (PVB) in particular containing more than 15% plasticizer by weight;

the transparent (thermo)plastic strip exhibits a haze of less than 5% and devoid of bubble defects (size of less than 0.1 mm), has an LT of at least 70%, 80% or 90%, the transparent support and thermoplastic strip assembly has an LT of at least 70% and exhibits a haze of less than 5% and/or the other transparent (thermo)plastic strip exhibits a haze of less than 5% and devoid of bubble defects (size of less than 0.1 mm), has an LT of at least 70%, 80% or 90%, the transparent support and thermoplastic strip assembly has an LT of at least 70% and exhibits a haze of less than 5%;

said plastic strip protrudes from the back face (by at most 10 cm) on at least one side, and even on two sides, makes adhesive contact with the lamination interlayer and/or said other plastic strip protrudes from the front surface (by at most 10 cm) on at least one side, and even on two sides, and makes adhesive contact with the lamination interlayer;

the lamination interlayer is made of poly(vinyl butyral) (PVB), in particular PVB with a hole or slot including the electrically controllable device, which is optionally:

acoustic, in particular for a vehicle windshield or roof and/or wedge-shaped, in particular for a windshield;

optionally with (heating, etc.) metal wires;

or else forming a composite PVB/functional plastic film element or first PVB/functional plastic film/second PVB composite element, the preferably transparent functional plastic film, such as a polyester or a PET, bearing a functional layer which is in particular electrically conductive, in particular PVB with a blind hole or slot in the first PVB.

The electrically controllable system may be chosen in particular from:

a capacitive or inductive control switch, an antenna;

one or more, in particular discrete, (opto)electronic components (surface-mounted on the front face of said support), in particular having a width W2<20 mm, in particular a sensor, a camera, a photodiode or an inorganic light-emitting diode, including a microLED; and 1) the plastic strip and the lamination interlayer make adhesive contact with the front face of the support, in particular the lamination interlayer houses the one or more (opto)electronic components, where in particular e'2>0.15 mm and e2<0.15 mm and even e3<0.15 mm, in a through- or blind aperture, preferably one dedicated aperture per (opto)electronic component, the optional other connecting element is between the interlayer and the bonding face and covers the one or more apertures;

or m) the other plastic strip is alone on the device, without the plastic strip, optionally apertured plumb with the one or more (opto)electronic components, where in particular e'2<0.15 mm and e2<0.15 mm and even e3<0.15 mm and e3 is greater than or equal to e2, in particular one hole per (opto)electronic component, and the lamination interlayer (preferably PVB) makes adhesive contact with the back face.

The sensor in the laminated glazing, in particular having a width W2 of at most 10 mm and/or a width of at most 2 mm or 1 mm and is chosen for example from one or more of the following sensors:

- a rain detector (preferably in the wiper zone) typically from 100 mm² to 600 mm² in size;
- a camera in the visible spectrum (anticollision detector, detector for detecting objects or persons, whether or not in motion) or an infrared camera (night vision, anticollision detector for objects or persons, whether or not in motion, for example trapezoidal in shape, or even a plurality of cameras of the same type for stereoscopic vision, in particular a CCD (charge-coupled device) and CMOS (complementary-metal-oxide-semiconductor) vision sensor;
- one or more (typically six) light sensors, such as a photodiode, typically from 1.2×1.4 mm² to 1.4×1.8 mm² in size or even having a thickness e'2 of at most 0.7 mm and even 0.7 mm and/or having a width W2 of at most 2 mm, for example APDS-9005 by AVAGO TECHNOLOGIES;
- a thermometer, thermocouple, typically a wire of 0.5 mm or less in thickness;
- an alarm sensor (detecting a fault in the integrity of the glazing, etc.), typically having a conductive wire size from 12 to 150 µm in diameter or by means of an electrically conductive layer (on face F2 or F3);
- a condensation detector linked to a (resistive, etc.) heating element, as an antifog, anticondensation or antifrost device, typically from 100 to 200 cm² in size, for example incorporated within a rain detector;
- an antenna-forming sensor, for example a conductive wire typically ranging from 12 µm to 0.5 mm in thickness, for receiving and/or transmitting electromagnetic (radio, TV, in particular local communication network such as Bluetooth, Wi-Fi, WLAN, etc.) waves, in particular within the lamination or embedded in a polymer material (film, etc.);
- an acoustic sensor (based on a piezoelectric element);
- an ultrasound signal detector, preferably on the face F2 (for example based on a piezoelectric element);
- a diagnostic sensor (faults in the vehicle laminated glazing, in particular windshield or lateral glazing) based on an (entire-surface) electrically conductive layer;
- a (wiper, etc.) control detector, for example IR control or voice (piezoelectric) control.

The electrically controllable system may be a surface system, in particular having a width W2 of at least 20 mm and even 50 mm and is in particular chosen from:

- a surface light system, such as an OLED organic light-emitting system (which may form a pictogram, etc.), a TFEL (thin-film electroluminescent element), or a quantum-dot light-emitting diode, referred to as a QLED;
- a digital signage system (screen) employing any technology, for example AMOLED technology;
- a (variable-scattering) liquid-crystal system, in particular a PDLC system (top band of a windshield, office partition, etc.), a light valve, an electrochromic system, and in particular the lamination interlayer houses the device (via a slot);

and/or:

i) said plastic strip is on the electrically controllable device without the other plastic strip, in particular said plastic strip protruding and making adhesive contact with the lamination interlayer and preferably making adhesive contact with the front face of the support;

or j) the other plastic strip is on the electrically controllable device without the plastic strip, in particular the other plastic strip protruding and making adhesive contact with the lamination interlayer and the lamination interlayer making adhesive contact with the back face of the support;

or k) said plastic strip is on the electrically controllable device, in particular protruding and making adhesive contact with the lamination interlayer and the other plastic strip is on the electrically controllable device, in particular protruding and making adhesive contact with the lamination interlayer (a sheet).

For an AMOLED screen, reference may be made to those described in the patents WO2017/115040, WO2017/115041, WO2017/115042 and WO2017/115043.

For an OLED forming a pictogram or backlighting a pictogram (enamel, etc.), reference may be made to those described in the patents WO2017103425 and WO2017103426.

For a liquid-crystal system, for example a partition for a dwelling, reference may be made to those described in the patents WO2011/161391 and WO2012/045973.

For a liquid-crystal system, for example a solar protection band in a windshield or for a light valve (SPD), reference may be made to those described in the patents DE 102013001334 A1, DE 102005049081 B3, DE 102005007427 A1, DE 102007027296 A1 and US-2015-0331296.

For a luminous touch switch, reference may be made to those described in the patents WO2018/002707 or WO2018/002723.

On the front surface of the chosen electrically controllable device light source (LED, OLED, TFEL, QLED, etc.), a collimation optic (Fresnel lens, prismatic film, crossed prismatic films, film with network of 2D patterns) may be used, and preferably without the other plastic strip or lamination interlayer between the collimation optic and the face of the glass making contact.

For the rear window, the assembly consisting of the light source and collimation optic may form a (third) stoplight or an indicator (side repeater) light, a position light or a sidelight.

For example (for the rear window or the front windshield) the light source preferably emits in the (MV) red and in particular is a luminous strip that is preferably rectangular and peripheral and that is horizontal; for example (for the rear window or the front windshield) the light source preferably emits in the (MV) yellow and in particular is a luminous strip that is preferably rectangular and peripheral and that is horizontal, in particular horizontal on the lower or lateral border of the window.

Preferably, with respect to a light-emitting system, the following preferably cumulative features are preferred:
- the light-emitting system is an organic light-emitting diode, i.e. a so-called OLED, in particular a transparent organic light-emitting diode (TOLED) or a quantum-dot light-emitting diode, i.e. a so-called QLED;
- the light-emitting system, in particular an OLED or QLED, is transparent, and has a light transmittance of at least 20% and even of at least 50%.
- the light-emitting system is a back-emitting OLED including the support (that is transparent or opaque or with an opaque layer) that bears, front face side, in this order starting from the support: an optional functional underlayer, a transparent anode, an organic light-emitting system or a reflective cathode.

The OLED may also comprise an encapsulation layer covering the assembly (the active area): resin that is for example transparent or even adhesive-coated plastic film, this plastic film provided with electrically conductive zones may serve for the electrical connection.

The light-emitting system may be masked from the exterior by a masking layer (enamel, etc.) on face F1 or F2.

The lamination interlayer is for example formed from one or more sheets. A conventional PVB such as RC41 by Solutia or Eastman may be chosen.

The lamination interlayer may comprise at least one what is called central layer made of viscoelastic plastic with vibro-acoustic damping properties, in particular based on polyvinyl butyral (PVB) and plasticizer, and the interlayer, and furthermore comprising two external layers made of standard PVB, the central layer being between the two external layers. Mention may be made, as an example of an acoustic sheet, of the patent EP 0 844 075. Mention may be made of the acoustic PVBs described in the patent applications WO2012/025685, WO2013/175101, in particular tinted as in WO2015079159.

The lamination interlayer may include an acoustic PVB and/or is a PVB that is tinted, said lamination interlayer in particular is a PVB at least partially in its thickness. The tinted portion is at least (and even at most) between the light-emitting element (OLED, QLED, etc.) and face F2.

The glass, preferably the internal glass in a laminated glazing, which in particular is thin and of thickness smaller than 1.1 mm, is preferably chemically tempered. It is preferably clear. Mention may be made of the examples of patent applications WO2015/031594 and WO2015066201.

In order to limit heating of the passenger compartment or to limit the use of air conditioning, the first glazing or one of the glazings at least (preferably the exterior glass) is tinted. Furthermore, the glazing, which is in particular laminated, may also include a layer that reflects or absorbs solar radiation, preferably on face F4 or on face F2 or F3, in particular a layer of transparent electrically conductive oxide, i.e. what is called a TCO layer, or even a stack of thin layers comprising at least one TCO layer, or stacks of thin layers comprising at least one silver layer (on F2 or F3 preferably for a laminated glazing), the or each silver layer being placed between dielectric layers.

It is possible to simultaneously have a (silver-containing) layer on face F2 and/or F3 and a TCO layer on face F4.

The TCO layer (of a transparent electrically conductive oxide) is preferably a layer of fluorine-doped tin oxide ($SnO_2$:F) or a layer of mixed indium tin oxide (ITO).

Other layers are possible, among which thin layers based on mixed indium zinc oxides (referred to as "IZOs"), based on gallium-doped or aluminum-doped zinc oxide, based on niobium-doped titanium oxide, based on cadmium or zinc stannate, or based on tin oxide doped with antimony. In the case of aluminum-doped zinc oxide, the doping level (that is to say, the weight of aluminum oxide with respect to the total weight) is preferably less than 3%. In the case of gallium, the doping level can be higher, typically within a range extending from 5 to 6%.

In the case of ITO, the atomic percentage of Sn is preferably within a range extending from 5 to 70% and in particular from 10 to 60%. For layers based on fluorine-doped tin oxide, the atomic percentage of fluorine is preferably at most 5% and generally from 1 to 2%.

ITO is particularly preferred, especially with respect to $SnO_2$:F. Of higher electrical conductivity, its thickness can be smaller to obtain one and the same emissivity level. Easily deposited by a cathode sputtering process, in particular a magnetron cathode sputtering process, these layers are characterized by a lower roughness and thus a lower tendency to foul.

One of the advantages of fluorine-doped tin oxide is, on the other hand, its ease of deposition by chemical vapor deposition (CVD), which, contrary to the cathode sputtering process, does not require a subsequent heat treatment and can be implemented on the float flat glass production line.

The term "emissivity" is understood to mean the normal emissivity at 283 K within the meaning of the standard EN12898. The thickness of the low-emissivity (TCO, and the like) layer is adjusted, depending on the nature of the layer, so as to obtain the desired emissivity, which depends on the sought-after thermal performance qualities. The emissivity of the low-emissivity layer is, for example, less than or equal to 0.3, in particular less than or equal to 0.25 or even less than or equal to 0.2. For layers made of ITO, the thickness will generally be at least 40 nm, or even at least 50 nm and even at least 70 nm, and often at most 150 nm or at most 200 nm. For layers made of fluorine-doped tin oxide, the thickness will generally be at least 120 nm, or even at least 200 nm and often at most 500 nm.

For example, the low-emissivity layer comprises the following sequence: high-index underlayer/low-index underlayer/a TCO layer/optional dielectric overlayer.

It is possible to choose, as preferred example of low-emissivity layer (protected during a tempering, high-index underlayer (<40 nm)/low-index underlayer (<30 nm)/an ITO layer/high-index overlayer (5-15 nm)/low-index barrier overlayer (<90 nm)/final layer (<10 nm).

Mention may be made, by way of low-emissivity layer, of those described in the patent US2015/0146286, on the face F4, in particular in examples 1 to 3.

In a preferred embodiment:
- the first and/or second glazing is tinted and/or the lamination interlayer is tinted over all or some of its thickness;
- and/or face F2 or face F3 or face F4—preferably face F4—of the glazed roof is coated with a low-emissivity layer, in particular one comprising a transparent electrically conductive oxide layer (i.e. what is called a TCO layer) and in particular a stack of thin layers containing a TCO layer or a stack of thin layers containing one or more silver layers;
- and/or face F2 or face F3 or face F4—preferably face F3—of the glazed roof is coated with a solar-control layer, in particular one comprising a transparent electrically conductive oxide layer (i.e. what is called a TCO layer) and in particular a stack of thin layers containing a TCO layer or a stack of thin layers containing one or more silver layers and/or an additional tinted (polymer, such as a polyethylene terephthalate PET, and the like) film is between the faces F2 and F3 or (bonded) on F4, indeed even on face F1.

In particular, the face F4 is coated with a transparent functional, in particular low-emissivity, layer that preferably comprises a TCO layer comprising a zone (supplied with electricity, therefore an electrode) forming a touch button (for controlling the first luminous area).

A transparent (PET etc.) film bearing a functional layer face-F2 (or as a variant face-F3) side may form a capacitive touch switch. It may be a question of the protective film.

The invention of course relates to any vehicle and in particular to an automobile including at least one glazing such as described above.

A diode can be of the chip-on-board type or even very preferably a surface mount device (SMD) then comprising a peripheral package.

The (chip-on-board or SMD) diode can be devoid of optical element (above the semiconductor chip (which is or is not embedded in the material)) in order to facilitate compactness. The package is, for example, made of epoxy. A polymer package can optionally shrink (the final thickness after lamination can be less than the initial thickness) during lamination. The (polymer) package can be opaque.

The inorganic diodes are, for example, based on gallium phosphide, gallium nitride or aluminum gallium nitride.

Mention may be made, as diodes, of the Oslon Black Flat range sold by Osram. For red light, mention may be made, as diode sold by Osram, of: Oslon Black Flat Lx H9PP. For the orange (amber) light, mention may be made, as diode sold by Osram, of: LCY H9PP. For white light, mention may be made, as diode sold by Osram, of: LUW H9QP or KW HxL531.TE, where x=is the number of chips in the diode (4 or 5, for example).

Mention may be made, as flexible PCB, of the Akaflex® range of products (in particular PCL FVV) from Krempel.

The present invention will now be described in greater detail with reference to the appended figures, in which:

FIG. 1 is a front view of a laminated windshield of an automotive vehicle on a road, which windshield includes internal luminous signaling by means of diodes and OLEDs in a first embodiment;

FIG. 1bis is a front view of a laminated windshield of an automotive vehicle on a road, which windshield includes internal luminous signaling by means of diodes and OLEDs in a variant of the first embodiment;

FIG. 1' is a front view of a laminated windshield of an automotive vehicle on a road, which windshield includes internal luminous signaling by means of diodes and OLEDs in a variant of the first embodiment;

FIG. 1" is a schematic front view of a laminated rear window with external luminous signaling in one embodiment of the invention;

FIG. 2 is a schematic cross-sectional view of a laminated glazing with an internal luminous signaling in one embodiment of the invention;

FIG. 2' is a schematic cross-sectional view of a luminous laminated glazing with diodes in a variant embodiment of FIG. 2 with its collimation optic for internal display; FIG. 2a is a top view of the collimation optic; FIG. 2b is an overview of the collimation optic;

FIG. 2bis is a schematic cross-sectional view of a luminous laminated glazing with diodes in variant embodiment of FIG. 2;

FIG. 2" shows a surface-mount diode mounted on a diode support;

FIG. 3 is a schematic cross-sectional view of a laminated glazing incorporating an (opto)electronic component in one embodiment of the invention;

FIG. 4 is a perspective view of a laminated glazing with diodes with the diode support;

FIG. 5 is a front view showing preassembly of the electrically controllable device using the lamination interlayer and by means of point adhesive contact;

FIG. 6 is a front view showing preassembly of the electrically controllable device using the lamination interlayer and by means of point adhesive contact;

FIG. 7 is a front view showing preassembly of the electrically controllable device with a plastic strip and by means of point adhesive contact;

FIG. 7a is a front view showing preassembly of the electrically controllable device with a plastic strip and by means of point adhesive contact;

FIG. 7b is a front view showing preassembly of the electrically controllable device with a plastic strip and by means of point adhesive contact;

FIG. 8 is a sectional view of the electrically controllable device, back plastic strip and interlayer preassembly before placement between the sheets of glass and lamination;

FIG. 8' is a sectional view of the device, back plastic strip and lamination interlayer preassembly before placement between the sheets of glass and lamination;

FIG. 9a shows an F1-side front view of a laminated glazing with an electrically controllable, for example surface, device such as an OLED for a light function (optionally forming a pictogram) or an OLED screen; FIG. 9b shows this glazing in section;

FIG. 9c shows an F1-side front view of a laminated glazing with an electrically controllable, for example surface, device such as an OLED for a light function (optionally forming a pictogram) or an OLED screen; FIG. 9d shows this glazing in section;

FIG. 10 is a sectional view of the electrically controllable device, plastic strip and interlayer preassembly before placement between the sheets of glass and lamination in order to form the glazing of FIG. 9d;

FIG. 10' is a sectional view of the electrically controllable device, plastic strip and interlayer preassembly of FIG. 9d before placement between the sheets of glass and lamination.

The elements are not to scale and the figures are schematic.

FIG. 1 shows (as seen from inside the vehicle) a windshield 1000 of an automotive vehicle traveling on a three-lane road with a car in front.

The windshield is a laminated glazing with internal luminous signaling and including:
  a first set of six diodes 4 on the front face 30 of a first printed circuit board, referred to as PCB 3, incorporated between the external glazing and the internal glazing 1' of the laminated glazing, which diodes in a row are positioned in the clear glass area in an edge zone of the windshield along the lower longitudinal edge, optionally in or in the vicinity of a peripheral masking zone (opaque enamel, and the like) of the exterior glazing (masking not shown) or even, in a variant, in a zone with an alternation of masking zone (opaque layer, such as an opaque enamel) and transparent zone (facing a diode) of the exterior and/or interior glazing;
  a second set of six diodes 4 on the front face 30 of a second printed circuit board, referred to as PCB 3, incorporated between the external glazing and the internal glazing 1' of the laminated glazing, which diodes in a row are positioned in the clear glass area in an edge zone of the windshield along the (left-hand) lateral edge, in particular driver side, optionally in or in the vicinity of a peripheral masking zone (opaque enamel, and the like) of the exterior glazing or even, in a variant, in a zone with an alternation of masking zone (opaque layer, such as an opaque enamel) and transparent zone (facing a diode) of the exterior and/or interior glazing;

a third set of six diodes 4 on the front face 30 of a third printed circuit board, referred to as PCB 3, incorporated between the external glazing and the internal glazing 1' of the laminated glazing, which diodes in a row are positioned in the clear glass area in an edge zone of the windshield along the (right-hand) lateral edge, in particular passenger side, optionally in or in the vicinity of a peripheral masking zone (opaque enamel, and the like) of the exterior glazing or even in a zone with an alternation of masking zone (opaque layer, such as an opaque enamel) and transparent zone (facing a diode) of the exterior and/or interior glazing.

These diodes, in particular of the first assembly, can emit red light, alerting the driver when the car in front (or any other means of locomotion or else an animal) is detected as too close. When the car in front is sufficiently far away (observation of the safe distance), the diodes are turned off.

These diodes, in particular of the second assembly, can emit red light, alerting the driver when a car (or any other means of locomotion or else an animal) is detected too close on the left-hand side of the car. The signaling light can also change from one color (for example orange or amber) when the vehicle is at a risky distance to another color, for example red, when the vehicle is at a shorter and even more dangerous distance.

In these cases, as many diodes as necessary are provided, for example one row with an alternation of red diodes and orange diodes, or one row per color. It is also possible to have at least three signaling levels (three colors).

The vehicle incorporates at least one sensor (preferably one per set of diodes) in order to detect these dangerous situations (nonobservation of the safe distance, or others) and at least one control unit for managing the diodes.

The diodes are not necessarily in a row, in particular parallel to the edge of the glazing. The PCBs 3 with diodes 4 are for example in the driver side lower quadrant.

If necessary, the front windshield includes a set of metal wires that are almost invisible, for example 50 µm in thickness, which are placed on a face, for example face F3 side of the lamination interlayer (over its entire area), in the form of lines that are optionally straight.

As they are in the clear glass area here, the PCBs 3 are preferably transparent.

Each PCB 3 is bonded with a thin and transparent (back) thermoplastic strip, the thickness e3 of which is at most 0.15 mm and better less than 100 µm and identical to the PCB in size, which strip is bonded on the back face side of the board (oriented toward the face F2) and the entire surface of which makes adhesive contact with the face F2, referred to as the contact face.

Before lamination, each PCB 3 and the what is referred to as the back transparent thermoplastic strip forms a preassembled element. The manufacture of the preassembled element will be described in greater detail further on.

As a variant, the thin and transparent thermoplastic strip has a thickness e3 of at most 0.15 mm and better less than 100 µm and is identical to the PCB in size, which strip is referred to as the front strip and bonded to the front face 30 of the board (oriented toward the face F3) and the entire surface of which makes adhesive contact with the face F3, referred to as the bonding face. The front strip may then be apertured plumb with the diodes or other, alternative discrete (opto)electronic components (sensors, etc.) or additionally, for example ultrathin components having a thickness e'2<0.15 mm. Before lamination, the front transparent thermoplastic strip forms a preassembled element. The manufacture of the preassembled element will be described in greater detail further on.

The windshield further includes two other surface electrically controllable devices, the shape of which here is rectangular, 4', 4", such as OLED screens for example in the middle and along the lower and upper longitudinal edges of the windshield. These screens are for example transparent and in the clear glass area.

In one configuration, a thin thermoplastic strip, which may or may not be transparent, referred to as the front strip has a thickness e3 of at most 0.15 mm and better of at most 100 µm and is identical to the OLED in size, which strip is bonded to the front surface of the OLED screen (light-emitting system side) and the entire surface of which makes adhesive contact with the face F3, referred to as the bonding face (which may be bare or coated). Before lamination, the OLED screen and the front transparent thermoplastic strip forms a preassembled element. The manufacture of the preassembled element will be described in greater detail further on.

In one additional or alternative configuration, a thin transparent thermoplastic strip, referred to as the back strip, the thickness e'3 of which is at most 0.15 mm and better at most 100 µm and is identical to the OLED in size, which strip is bonded to the surface of the OLED support (which substrate is preferably flexible, in particular polyester, PET) and the entire surface of which makes adhesive contact with the face 12 F2, referred to as the contact face (which may be bare or coated). Before lamination, the OLED screen and the back transparent thermoplastic strip forms a preassembled element. The manufacture of the preassembled element will be described in greater detail further on.

Before lamination, each device 4, 4" and the front and/or back transparent thermoplastic strip forms a preassembled element. The manufacture of the preassembled element will be described in greater detail further on.

It is also possible to provide (or not to provide) a luminous touch button in the laminated glazing to control the OLED screens or other devices, etc. This capacitive switch may for example be preassembled with a front and/or back plastic strip as mentioned above.

Alternatively, it is possible to produce, in a similar manner, a luminous laminated roof with diodes and/or OLEDs, QLEDS or a TFEL, for example providing ambient light, decorative light or a reading light oriented toward the face F4.

On the front surface, it is possible to use a collimation optic, preferably without a front plastic strip or lamination interlayer between the collimation optic and the face of the glass making contact.

FIG. 1b is shows another windshield of an automotive vehicle, which windshield 1000 includes the luminous signaling in a variant of the first embodiment.

It differs from the windshield in FIG. 1 in the more peripheral location of the three PCBs 3, which may be opaque (opaque support and/or opaque conductive tracks). The face 12 F2 comprises an entire masking frame, preferably made of black enamel, and the face F4 14 (or the face 13 F3) includes a masking frame 72, preferably made of black enamel, with apertures 70 in line with the diodes 4.

In this embodiment, the front or back thermoplastic assembly strip 5 may be transparent (tinted, etc.) or opaque. This strip 5 makes adhesive contact with the masking layer 71.

Furthermore, the OLED screen 4' at the bottom of the windshield is in the enameling zone and an aperture 70 is made plumb with the screen 4'.

FIG. 1' is a front view of a windshield of an automotive vehicle on a road, which windshield 1000' includes internal or even external luminous signaling by means of diodes in a variant of the first embodiment.

It differs from that of FIG. 1 in the placement and the type of signaling.

The first set of diodes 4c, on a PCB-like support 30C, forms a triangle with, if possible, a central exclamation mark. It thus forms a danger signal.

The second and third set of diodes 4a and 4b, each on their PCB-like support 30a and 30b, form arrows indicating when the (respectively left or right) indicator is engaged.

These indicator side repeaters may be visible from the exterior (external signaling). It is possible to shift the left indicator as far to the left as possible (if in masking zone on face F2 with aperture plumb with the diodes) or to divide it into two and the right indicator as far to the right as possible (if in masking zone on face F2 with aperture plumb with the diodes) or to divide it into two.

Each PCB 30a, 30b and 30c is bonded with a thin thermoplastic strip, the thickness e3 of which is at most 0.15 mm and is identical to the PCB in size, which strip is bonded on the back face side of the board (oriented toward the face F2) and the entire surface of which makes adhesive contact with the face F2, referred to as the contact face.

Before lamination, each PCB 30a, 30b and 30c and the thermoplastic strip form a preassembled element.

If in the clear glass area, the PCBs 30a, 30b and 30c and the thermoplastic strips are preferably thin and transparent. It is possible to envisage shifting them in a manner analogous to FIG. 1bis into a peripheral masking frame.

Furthermore, the OLED screen 4", in a central upper peripheral position on the windshield, is in the enameling zone 72, which is widened at the center, and an aperture 70 is made plumb with the screen.

FIG. 1" is a schematic front view (face F1 or face 12 side) of a rear window having external luminous signaling 100" in one embodiment of the invention.

In the central zone 13', a third stop light 101 is formed with, for example, six red diodes 4 on the PCB 3 along the top longitudinal edge.

In each lateral zone 14', an indicator 102 is formed for example with six diodes 4 emitting in the yellow on the PCB 3 along the lateral edge in question, or even a signaling light 103 with for example six diodes 4 on the PCB 3 along the lower longitudinal edge in question.

Each PCB 3 is bonded with a thin thermoplastic strip, the thickness e3 of which is at most 0.15 mm and is identical to the PCB in size, which strip is bonded on the back face side of the board (oriented toward the face F3) and the entire surface of which makes adhesive contact with the face F3, referred to as the contact face.

Before lamination, each PCB 3 and the thermoplastic strip forms a preassembled element.

If in the clear glass area, the PCBs 3 and the thermoplastic strips are preferably thin and transparent. It is possible to envisage shifting them in a manner analogous to FIG. 1bis into a peripheral masking frame.

The rear window further includes another surface electrically controllable device, the shape of which here is rectangular 4', such as an OLED for example in the middle and along the lower longitudinal edge of the windshield. The OLED is for example transparent and in the clear glass area.

In one configuration, a thin thermoplastic strip, which may or may not be transparent, referred to as the front strip has a thickness e3 of at most 0.15 mm and better of at most 100 μm and is identical to the OLED in size, which strip is bonded to the front surface of the OLED (light-emitting system side) and the entire surface of which makes adhesive contact with the face F3, referred to as the bonding face. Before lamination, the OLED and the front transparent thermoplastic strip forms a preassembled element.

In one additional or alternative configuration, a thin transparent thermoplastic strip, referred to as the back strip, the thickness e'3 of which is at most 0.15 mm and better at most 100 μm and identical to the OLED in size, which strip is bonded to the surface of the OLED support (which substrate is preferably flexible, in particular polyester, PET) and the entire surface of which makes adhesive contact with the face F2, referred to as the contact face. Before lamination, the OLED and the back transparent thermoplastic strip forms a preassembled element. Before lamination, the device 4 and the front and/or back transparent thermoplastic strip forms a preassembled element.

Alternatively, it is possible to produce, in a similar manner, a laminated glazing forming a (fixed or opening) lateral glazing with external luminous signaling such as an indicator side repeater or else for example an advertising, information or decorative display.

FIG. 2 is a schematic cross-sectional view of an internal front windshield with luminous signaling 100 in a first embodiment of the invention, comprising a curved laminated glazing including:

- a first glazing 1, for example made of TSA glass and with a thickness of 2.1 mm, forming the exterior glazing, which is preferably tinted, with first and second main faces 11, 12 respectively called face F1 and face F2, and an edge face 10;
- a preferably clear lamination interlayer 2 made of a polymer material, here of PVB, the thickness e1 of which is submillimeter-sized and preferably in particular between 0.2 mm et 1 m, conventionally around 0.38 mm, for example a PVB sheet (RC41 from Solutia or Eastman) of about 0.76 mm in thickness or as a variant if necessary a (trilayer or quadlayer) acoustic PVB for example of about 0.81 mm in thickness, the face FB face F3 side optionally bearing a set of metal wires covering (substantially) the surface in particular facing the one or more diodes;
- a second glazing 1', forming the interior glazing, for example made of TSA, or clear or extra-clear, glass and of 2.1 mm or even 1.6 mm or even smaller thickness, with third and fourth main faces 13, 14 respectively called face F3 and face F4, face F4 optionally being coated with a functional layer (low-E layer, etc.), the face F2 and the face F3 being the internal faces 12, 13 of the laminated glazing;
- a set of inorganic light-emitting diodes 4, which are surface-mount devices (SMDs), for example emitting in the red on a support such as a PCB 3 with an edge face 34, the PCB+diodes assembly having a total thickness et2≤e1 and better still with e1−et2 being at most 0.5 mm and preferably 0.1 mm to 0.2 mm, the diodes having a submillimeter-sized thickness e2 that is often greater than 0.15 mm and the PCB 3 having a thickness e'2 of at most 0.15 mm, for example from 50 to 100 µm, with a face called the front face 30 facing the face F3 and a back face 30' against the face F2 or face 12, each diode having an emitting face emitting in the direction of the interior glazing 1', and each diode having an edge face.

For each of the diodes, the lamination interlayer is a region 21 comprising an opening, here a through opening, surrounding the edge face of the diode and making contact with the edge face. Before lamination, through-holes are made in the single PVB sheet, the width of which is slightly greater on the side of the diodes 4. During lamination by reflow, the PVB may come into contact with the diodes 4 without coming between the front face and the face F3.

As a variant, a PVB with blind holes is used or else this sheet with through-holes is retained and an entire-surface PVB or even PVB/functional PET/PVB back sheet (for inserting other, thicker elements for other functionalities, etc.) is added (between F3 and the apertured sheet referred to as the front sheet). After lamination, the diodes are then in blind apertures and the front face preferably makes contact with the bottom of the hole or is spaced away therefrom by at most 0.2 mm or by at most 0.1 mm.

The diodes 4 (with a single semiconductor chip here) are square in shape and of width of about 5 mm or less. A diode can be of the chip-on-board type or even very preferably a surface mount device (SMD) then comprising a peripheral package.

Here, in the clear glass area, the thinnest possible and even preferably the discreetest possible flexible PCB 3 (minimum width or even transparent), for example including a transparent film such as a film of PET, PEN or a polyimide, will be chosen, and, even for the printed circuit, transparent connection tracks may be chosen (rather than tracks made of copper unless they are made sufficiently thin). The PCB may protrude from the edge face of the laminated glazing.

The lamination interlayer 2 is present in the laminated glazing between the face F3 and the front face of the PCB 3 over the entirety of the front face of the PCB excluding diodes. The lamination interlayer 2 is absent from the back face 30'.

Before lamination, the PCB 3 is bonded to a thin thermoplastic strip 5, the thickness e3 of which is at most 0.15 mm, in particular from 25 to 100 µm, 40 to 70 µm and even at most 50 µm and identical in size to the PCB or slightly protruding, as shown here, from the edge face 34, the front face 50 of which strip is bonded to the back face 30' of the board (oriented toward the face F3) and the entire surface of the back face 50' of which makes adhesive contact with the face F2 12, referred to as the contact face.

Before lamination, each PCB 3 and the thermoplastic strip 5 forms a preassembled element.

The thermoplastic strip is based on poly(vinyl butyral) (PVB) containing less than 15% plasticizer by weight, preferably less than 10% by weight and even better less than 5% by weight and in particular without plasticizer. The lamination interlayer is made of conventional poly(vinyl butyral) (PVB).

In particular, the product "MOWITAL LP BF" by KURARAY may be chosen for the PVB strip without plasticizer with the thickness e3 as desired.

In one variant, for protecting the diodes, another plastic strip, the size, nature and thickness e'3 of which is similar between the face 13 F3 and the face 20 of the PVB, is added.

As shown in FIG. 2, each diode is an electronic component including at least one semiconductor chip 41, and is provided with a polymer or ceramic peripheral package 42 encapsulating the edge face of the electronic component (and defining the edge face of the diode), said package surrounding the semiconductor chip.

The package can correspond to the maximum thickness (height) e2 of the diode. The package is, for example, made of epoxy. A polymer package can optionally shrink (the final thickness after lamination can be less than the initial thickness) during lamination. The (polymer) package can be opaque.

The package (which is monolithic or made of two segments) can comprise a part 42 forming a support carrying the chip and a part forming a reflector which widens with distance from the support higher than the chip, and containing a protective resin and/or a material having a color conversion function. The front surface 40 can be defined as the surface of this material covering the chip set back from or level with the "front" surface of the reflector.

The diode can comprise a protective resin or a material having a color conversion function, even just on the semiconductor chip. The semiconductor chip can be embedded in a material (resin, and the like).

FIG. 2' is a schematic cross-sectional view of a luminous laminated glazing using diodes in a variant embodiment of FIG. 2 with the addition of a collimation optic 8, which is here a prismatic film 81 with its contiguous prisms on the output face 80 side and with a back face 80' on the front surface side of diode 4, housed in a hole 21 of the PVB, which film is held by lugs 82 to the front face of the PCB support 3. FIG. 2a is a top view of the collimation optic which is here a prismatic film with its contiguous prisms 80 and an edge face 85. FIG. 2b is an overview of the prismatic film with its contiguous prisms 80.

Examples of collimation optics such as a Fresnel lens or a prismatic film are described in the application WO2017203171 (for example FIG. 3a et FIG. 2'a to 2'c). Examples of collimation optics such as two crossed prismatic films or a two-dimensional array are described in the application WO2017/203175 (for example FIG. 2'a to 2'c and FIG. 1'a to 1'z).

FIG. 2bis is a schematic cross-sectional view of a luminous laminated glazing 200a using diodes in a variant embodiment of FIG. 2.

It differs in that the plastic strip 5 is on the masking enamel on the face F2 12 and apertures 72' plumb with the diodes are made in the masking enamel 72 on the face F4 14.

For example, the front face is bonded to the PVB by spots of adhesive 6' before lamination.

The invention has been described with reference to diodes but is suitable for other discrete electrically controllable devices such as sensors (photodiodes, cameras, etc.).

FIG. 3 is a schematic cross-sectional view of a laminated glazing 300 incorporating an (opto)electronic component as a sensor in one embodiment of the invention.

The support 3 is here bonded to the contact face 13, which is the face F3, by a thermoplastic strip such as thin and transparent PVB, such as already described in the preceding figures.

In particular, the support extends beyond the PVB following the edge face via a portion 51 and is folded by a portion 52 at the face F4 14 and the strip 5 bonds to the edge face and to the face F4. A connector 53 is connected to the end of the portion 52.

FIG. 4 is a schematic cross-sectional view of a luminous laminated glazing 400 using diodes in a variant embodiment of FIG. 2.

It differs in that the support 3 is L-shaped, with a diode zone 31 and an electrical power supply zone 32 with an extension 33 protruding from the edge face 10' of the glazing 1' which is connected to wires 9, 9' and partly masked by the enamel 7. The back plastic strip 5 (shown for explanatory purposes) takes the same, i.e. L, shape. For example, the PVB is set back from the edge face 10'.

FIG. 5 is a front view showing preassembly of the electrically controllable device 500 using the lamination interlayer and by means of point adhesive contact. FIG. 5 shows the point adhesive contact of a front face 50 of a preferably transparent, square- or rectangular-shaped, local thin back plastic strip 5, which point adhesive contact is with a connecting face 20' of a PVB back sheet 2 intended to make contact with the contact face F2 12 of the glazing (edge face 10 shown) or the bonding face F3.

The support 3 for diodes 4 is rectangular in shape and protrudes from the edge face 10. The front face 50 of the plastic strip 5 is against the back face of the diode support and the plastic strip 5 protrudes from the edge face 34.

The point adhesive contact is achieved by means of an array of point contacts 60 on either side of the diode zone 31 between PVB and protruding strip 5. To achieve this, the PVB and/or the plastic strip 5 is softened by means of point local heating or by using a solvent such as alcohol.

FIG. 6 is a front view showing preassembly of the electrically controllable device 600 using the lamination interlayer and by means of point adhesive contact. The preassembly differs from FIG. 5 in that the support 3 is L-shaped, just like the preferably thin and transparent back plastic strip 5.

FIG. 7 is a front view showing preassembly of the electrically controllable device 700 with a plastic strip and by means of point adhesive contact.

The preassembly differs from FIG. 6 in that the strip 5 does not protrude from the edge face 34.

The point adhesive contact is achieved by means of an array of point contacts 60 on the opposite side of the diode zone 31 on either side of the diode zone 31 between the back face 30' of the PCB 3 and the strip 5 and side opposite the power supply zone 32. To achieve this, the plastic strip 5 is softened by means of point local heating.

FIG. 7a is a front view showing preassembly of the electrically controllable device 700a with a plastic strip 5 and by means of point adhesive contact. The preassembly differs from FIG. 7 in that the support is T-shaped and the local thin plastic strip 5 is identically T-shaped.

FIG. 7b is a front view showing preassembly of the electrically controllable device 700b with a plastic strip and by means of point adhesive contact.

The preassembly differs from FIG. 7 in that the support is U-shaped, hence with two emergent extensions from the glazing 33, 33', and the local thin plastic strip 5 is identically U-shaped.

FIG. 8 is a sectional view of the electrically controllable device, local back plastic strip 5 and lamination interlayer 2 preassembly 800 before placement between the sheets of glass and lamination.

The front face 50 of the thin and transparent back plastic strip 5 is brought into point adhesive contact with the back face 30' of the support 3 for the diodes 4 via an array of contacts 60 resulting from local heating 7.

The front face 30 of the support for the diodes is brought into point adhesive contact with the face 20' of the PVB 2 via an array of contacts 60 resulting from local heating 7. Said PVB is provided with individual through-holes 21 housing the diodes 4.

As a variant, they may be blind holes and the PVB may even be a PCB/PET/PVB assembly.

FIG. 8' is a sectional view of the electrically controllable device, back plastic strip and lamination interlayer preassembly 800' before placement between the sheets of glass and lamination.

The front face 50 of the thin and transparent back plastic strip 5 is brought into point adhesive contact with the face 20', referred to as the connecting face, of the PVB 2 via an array of contacts 60a resulting from local heating.

The front face 50 of the thin and transparent back plastic strip 5 is optionally brought into point adhesive contact with the back face 30' of the support 3 for the diodes via an array of contacts 6 resulting from local heating.

Optionally, the front face 30 of the support for the diodes is brought into point adhesive contact with the face 20' of the PVB 2 via an array of contacts 6' resulting from local heating, said PVB 2 being provided with individual through-holes housing the diodes 4.

FIG. 9a shows an F1-side front view of a laminated glazing with an electrically controllable, for example surface, device 900 such as an OLED for a light function (optionally forming a pictogram) or an OLED screen. FIG. 9b shows this glazing in section.

This is for example a windshield with an OLED in the form of a pictogram, an OLED screen 4 or a roof with an OLED. This may be a building glazing.

The luminous laminated glazing is curved, including:
  a first glazing 1, for example made of TSA glass and with a thickness of 2.1 mm, forming the exterior glazing, which is preferably tinted, with first and second main faces 11, 12 respectively called face F1 and face F2, and an edge face 10, the face F2 optionally being coated with a functional layer (masking layer, etc.);
  a second glazing 1', forming the interior glazing, for example made of TSA (or clear or extra-clear) glass and of 2.1 mm or even 1.6 mm or even smaller thickness, with third and fourth main faces 13, 14 respectively called face F3 and face F4, face F4 optionally being coated with a functional layer (low-E layer, etc.) and/or face F3 optionally being coated with a functional layer (masking layer, heating layer, low-emissivity layer, etc.);
  between F2 and F3, a preferably clear lamination interlayer 2 made of a polymer material, here of PVB, the thickness e1 of which is submillimeter-sized and preferably in particular between 0.2 mm et 1 m, conventionally around 0.38 mm, for example formed from a first, entire sheet 2a making adhesive contact with the face 13 F3 after lamination and from a second, apertured PVB sheet 2b provided with a slot 25 and on the first sheet making adhesive contact with the face 12 F2 and with the first sheet after lamination,
the face F2 and the face F3 being the internal faces 12, 13 of the laminated glazing;
  the OLED 4 including a support 3 and a light-emitting system on the front face side housed in the slot 25, the thickness e2+e'2 of which is smaller than the thickness of the apertured sheet 2b;
  a thermoplastic, in particular PVB without plasticizer, strip, the thickness e3 of which is at most 0.3 mm and which is identical to the OLED in size, is bonded to the OLED (on the side of the support or front surface of the light-emitting system), the entire surface of the back face of the strip making adhesive contact with the face F2 12.

The thermoplastic strip is based on poly(vinyl butyral) (PVB) containing less than 15% plasticizer by weight, preferably less than 10% by weight and even better less than 5% by weight and in particular without plasticizer. In particular, the product "MOWITAL LP BF" by KURARAY may be chosen for the PVB strip without plasticizer with the thickness e3 as desired.

The lamination interlayer is made of conventional poly (vinyl butyral) (PVB). It may be acoustic, wedge-shaped (for a head-up display), PVB/functional PET/PVB composite. The entire sheet may in particular be acoustic, wedge-shaped (for a head-up display), PVB/functional PET/PVB composite. The apertured sheet may in particular be tinted. As a variant, a single PVB with a blind hole is used.

Before lamination (and before placement between the two glazings), the plastic strip 5 is assembled together with the OLED 4 by means of local heating, resulting in point adhesive contact, or by means of bonding (adhesive or double-sided tape), and optionally the OLED 4 is assembled together with the entire sheet 2a, for example by means of local heating.

Here, the OLED 4 emits in the direction of the face F4 (internal light) and the OLED emits through the OLED support 3 (it is bottom-emitting). The plastic strip 5 is then on the front surface of the OLED, on the light-emitting system (which may or may not have polymer encapsulation).

Here, the OLED 4 emits in the direction of the face F4 (internal light) and the OLED is top-emitting. The plastic strip is then on the back face of the support 3, hence opposite the light-emitting system (which may or may not have polymer encapsulation).

FIG. 9c shows an F1-side front view of a laminated glazing with an electrically controllable, for example surface, device such as an OLED for a light function (optionally forming a pictogram) or an active-matrix OLED (AMO-LED) screen. FIG. 9d shows this glazing in section.

This glazing 900' differs from the glazing of FIG. 9 in that:
the light is emitted on face F1 11 side, for example for rear window, side window or even windshield luminous signaling (indicator side repeater, etc.);

and in that the OLED 4 emerges from the apertured sheet 2b on the F2 12 side.

Thus, to compensate for the difference in thickness H between the PVB 2b and the OLED 4 F2 side, a PVB frame 5a made of plastic material that is identical to the plastic strip 5 is around the periphery of the OLED.

If H is large (at least 0.15 mm for example), a plurality of stepped plastic frame strips may be used.

As a variant, if H<0.15 mm, the plastic strip 5 is chosen so as to protrude over the PVB and is preassembled together with the PVB 2b, for example by means of local heating.

As a variant, a single PVB with a blind hole is used.

The lamination interlayer is made of conventional poly (vinyl butyral) (PVB). It may be acoustic, wedge-shaped (for a head-up display), PVB/functional PET/PVB composite. The entire sheet may in particular be tinted, acoustic, wedge-shaped (for a head-up display), PVB/functional PET/PVB composite. The apertured sheet may in particular be tinted.

FIG. 10 is a sectional view of the electrically controllable device, plastic strip and lamination interlayer preassembly 900 before placement between the sheets of glass and lamination in order to form for example the glazing 900 of FIG. 9d.

The front face 50 of the thin and transparent plastic strip 5 is brought into point adhesive contact with the back face of the support for the diodes 3 via an array of contacts 60 resulting from local heating 7 causing softening and adhesion.

The front face 30 of the OLED 4 is optionally brought into point adhesive contact with the face 20 of the entire PVB sheet 2a via an array of contacts 60b resulting from the same local heating 7.

The front face 50a of the plastic frame 5a, of similar material to the strip 5, is brought into adhesive contact with the face of the entire PVB sheet 2a via an array of contacts 60a resulting from local heating 7.

Next, the preassembled element is placed between two glazings, the free faces of the two sheets 2a and 2b make adhesive contact with the faces F2 and F3 (which may be bare or coated with a layer) after lamination, and the free faces of the plastic strips 5, 5a make adhesive contact with one of the faces F2 or F3 (which may be bare or coated with a layer), as desired, also after lamination.

FIG. 10' is a sectional view of the electrically controllable device, plastic strip and lamination interlayer preassembly 900' before placement between the sheets of glass and lamination in order to form for example a variant of the glazing 900 of FIG. 9d. Two plastic strips, one of which, referred to as the back strip 5, is on the side of the back face of the support and the other of which, referred to as the front strip 5', is on the side of the front surface of the (OLED, etc.) device 4, are preassembled and protrude over a (composite PVB, PVB) lamination interlayer sheet 2b provided with a slot 25 housing the electrically controllable system 4.

The front face of the back plastic strip 5 is optionally brought into point adhesive contact with the back face 30' of the support 3 for the diodes via an array of point contacts 60b resulting from local heating 7 causing softening and adhesion.

The front face 50 of the back plastic strip 5 is brought into point adhesive contact with a face 20 of the PVB 2b via an array of point contacts 60a resulting from local heating 7 causing softening and adhesion.

The front face of the front plastic strip 5' is brought into point adhesive contact with the other face 20' of the PVB 2b via an array of point contacts 60" resulting from local heating 7 causing softening and adhesion. The same heating face 20 side may suffice face 20' side.

Next, the preassembled element is placed between two glazings, the faces 20' and 20' make adhesive contact with the faces F2 and F3 (which may be bare or coated with a layer) after lamination, and the same for the free faces of the plastic strips 5, 5'.

The invention claimed is:

1. A process for manufacturing a glazing with an electrically controllable device, comprising a laminated glazing including:
   a first transparent glazing, with first and second main faces;
   a second transparent glazing, with third and fourth main faces;
   a lamination interlayer made of thermoplastic polymer material, a majority of the second face and a majority of the third face making adhesive contact with the lamination interlayer, and the laminated glazing comprising, between the second and third faces:
   an electrically controllable device, including a support that has a front face, a back face and an edge face, and having a thickness e2, the front face bearing, in a functional zone, an electrically controllable system having a thickness e'2 and the front face optionally including an electrical power supply zone adjacent to the functional zone, the electrically controllable device having an area smaller than a surface area of the lamination interlayer, the electrically controllable device having a front surface on the electrically controllable system side
and the glazing including:
on the back face, a polymer connecting element having a thickness e3 of at most 0.3 mm, making adhesive contact with the back face and with one of the second and third main faces, then referred to as a contact face, which contact face may be bare or coated with a layer, the connecting element having an area smaller than a surface area of the lamination interlayer;
and/or on a front face side, on the front surface, another polymer connecting element having a thickness e'3 of at most 0.3 mm, making adhesive contact with the electrically controllable device and with one of the second and third main faces, then referred to as a bonding face, which bonding face may be bare or coated with a layer, the other connecting element having an area smaller than the surface area of the lamination interlayer;
the process comprising:
before lamination, providing a preassembled element including the electrically controllable device, said connecting element and/or the other connecting element and optionally at least one assembly sheet of lamination interlayer,
the connecting element comprising a thermoplastic strip which has a main connecting face $F_L$, facing the back face of the support, and the thermoplastic strip having a free main face F', opposite the connecting face $F_L$;
the connecting face $F_L$ making adhesive contact with or being bonded to the back face;
and/or the connecting face $F_L$ protruding beyond the edge face of the support on at least one side defining a protruding zone ZD facing a zone ZA of one of the main faces of the assembly sheet, the protruding zone ZD making adhesive contact with or being bonded to the zone ZA;
and/or
the other connecting element comprising another thermoplastic strip which has a main other connecting face $F'_L$, facing the front surface of the electrically controllable device, and the other thermoplastic strip having a free main face F''', opposite the other connecting face $F'_L$;
the other connecting face $F'_L$ making adhesive contact with or being bonded to the electrically controllable device;
and/or the other connecting face $F'_L$ protruding beyond the edge face of the electrically controllable device on at least one side defining another protruding zone Z'D facing another zone Z'A of one of the main faces of the assembly sheet, the other protruding zone ZD making adhesive contact with or being bonded to the zone Z'A;
placing said preassembled element between the first and second transparent glazings;
and laminating said preassembled element including an operation of placing under vacuum, or an operation of placing under pressure, and a heating operation, the lamination step resulting in the free face being brought into adhesive contact with the contact face and/or the free face F'L being brought into adhesive contact with the bonding face,
wherein the adhesive contact is achieved by softening the thermoplastic strip and/or the other thermoplastic strip.

2. The process for manufacturing a glazing with an electrically controllable device as claimed in claim 1, wherein the thermoplastic strip is transparent and/or the other thermoplastic strip is transparent, the support is transparent, the placement of said preassembled element between the first and second glazings is in a transparent zone of the first and/or second glazing, the transparent strip covering the back face at least opposite said functional zone and/or the other transparent strip covering at least said functional zone.

3. The process for manufacturing a glazing with an electrically controllable device as claimed in claim 1, further comprising forming said preassembled element according to at least one of the following configurations:
a) assembling the connecting element together with the support, the connecting face $F_L$ being brought into adhesive contact with or bonded to the back face, the entire surface or points of the surface of which connecting face $F_L$ is/are brought into adhesive contact with the point back face by means of an array of spaced point adhesive contacts or the entire surface or points of the surface of which connecting face $F_L$ is/are bonded to the back face by means of an array of spaced point adhesive contacts; and/or
a') assembling the other connecting element, the other connecting face $F'_L$ being brought into adhesive contact with or bonded to the electrically controllable device, the entire surface or points of the surface of which other connecting face $F'_L$ is/are brought into adhesive contact by means of an array of spaced point adhesive contacts or the entire surface or points of the surface of which connecting face $F'_L$ is/are bonded by means of an array of spaced point adhesive zones;
and/or
b) assembling the connecting element together with the lamination interlayer, points of the surface or the entire surface of the protruding zone ZD being brought into adhesive contact with the zone ZA by means of an array of spaced point adhesive contacts or the connecting face is bonded via an array of point adhesive zones or its entire face to the zone ZA;
and/or
b) assembling the other connecting element together with the lamination interlayer, points of the surface or the entire surface of the other protruding zone Z'D being brought into adhesive contact with the zone Z'A by means of an array of spaced point adhesive contacts or the other connecting face is bonded via an array of point adhesive zones or its entire face to the zone Z'A.

4. The process for manufacturing a glazing with an electrically controllable device as claimed in claim 3, wherein the adhesive contact is a point contact and achieved by means of local heating and optionally also by means of pressure.

5. The process for manufacturing a glazing with an electrically controllable device as claimed in claim 4, wherein during said operation of preassembling together with the connecting element or together with said other connecting element, the electrically controllable device is on a first sheet of the lamination interlayer, and a second sheet of the lamination interlayer is on the first sheet, the local heating resulting in the first sheet being brought into point contact with the second sheet.

6. The process for manufacturing a glazing with an electrically controllable device as claimed in claim 4, wherein, during said operation of preassembling together with the connecting element, the front surface of the electrically controllable device is on a first sheet of the lamination interlayer, the local heating resulting in the front surface of the electrically controllable device being brought into point contact with said first sheet of the lamination interlayer.

7. The process for manufacturing a glazing with an electrically controllable device as claimed in claim 1, wherein the thermoplastic strip and said lamination interlayer are spaced before lamination and after lamination the thermoplastic strip and said lamination interlayer make continuous contact, without leaving space between the back face and contact face and/or the other thermoplastic strip and said lamination interlayer are spaced before lamination and after lamination the other thermoplastic strip and said lamination interlayer make continuous contact, without leaving space between the front surface of the device and the bonding face.

8. The process for manufacturing a glazing with an electrically controllable device as claimed in claim 1, wherein the strip is based on poly(vinyl butyral) (PVB) containing less than 15% plasticizer by weight and/or the other strip based on poly(vinyl butyral) (PVB) containing less than 15% plasticizer by weight.

9. The process for manufacturing a glazing with an electrically controllable device as claimed in claim 1, wherein, before lamination, the thermoplastic strip protrudes from the edge face of one of the first and second glazings and is folded over the fourth main face or the first main face or the other thermoplastic strip protrudes from the edge face of one of the first and second glazings and is folded over the fourth main face or the first main face.

10. The process for manufacturing a glazing with an electrically controllable device as claimed in claim 1, wherein, before the placement of said preassembled element including the other connecting element, the lamination interlayer comprises a back sheet, which is optionally said assembly sheet, with a main face F'x which is placed against the back face of the support, and the main face of the back sheet F'x optionally includes said zone Z'A, the other thermoplastic strip, referred to as the front thermoplastic strip, is against the front face, and on the electrically controllable system which includes a set of discrete components, and, after lamination, the back sheet makes adhesive contact with the back face.

11. The process for manufacturing a glazing with an electrically controllable device as claimed in claim 1, wherein, before the placement of said preassembled element including the connecting element and optionally the other connecting element, the lamination interlayer comprises a front sheet, which is optionally said assembly sheet, with a main face Fx placed against the front surface of the electrically controllable device, and the main face of the front sheet Fx optionally including said zone ZA, and, after lamination, the front sheet makes adhesive contact with the front surface of the electrically controllable device.

12. The process for manufacturing a glazing with an electrically controllable device as claimed in claim 11, wherein the main face of the front sheet includes at least one blind hole or through-hole, a width of which is at most 20 mm, housing the electrically controllable system, and wherein, where e'2>0.15 mm, e2<0.15 mm and e3<0.15 mm, the front sheet making adhesive contact with the front face of the support, the hole is optionally a through-hole and the optional other thermoplastic strip between the bonding face and the front sheet covers each component in a through-hole.

13. The process for manufacturing a glazing with an electrically controllable device as claimed in claim 1, wherein, before the placement of said preassembled element including said connecting element and/or the other connecting element, the lamination interlayer includes an apertured sheet thus including an aperture housing all or part of the electrically controllable system and of the support, the apertured sheet having the main face Fx which is free and optionally including said zone ZA or F'x and optionally including the zone Z'A, the thermoplastic strip faces the aperture, with a difference in height H1 between the face Fx and the free face $F_L$ of the thermoplastic strip of at most 0.3 mm and/or the other thermoplastic strip faces the aperture, with a difference in height H'1 between the face F'x and the free face $F'_L$ of the other thermoplastic strip of at most 0.3 mm.

14. The process for manufacturing a glazing with an electrically controllable device as claimed in claim 13, wherein, before lamination with the preassembled element including the connecting element, the electrically controllable device emerges from the apertured sheet, the electrically controllable device and the main face Fx are spaced apart by a nonzero height H2 that is greater than e2, H2 being at most 0.3 mm, the process comprises the positioning of an additional plastic strip forming a frame on the edge face of the electrically controllable device, the thickness Ex of which is at most 0.15 mm and smaller than or equal to H2, and faces a zone of the apertured sheet, and the additional plastic strip has a main face F''', opposite a connecting face FC, the additional plastic strip optionally includes a single strip or a plurality of stepped plastic strips and Ex is then the total thickness of the plastic strips, and by the lamination step, said other free face of the additional plastic strip is brought into adhesive contact with the contact face.

15. A glazing with an electrically controllable device obtained as claimed in claim 1, comprising a laminated glazing including:
a first transparent glazing, with first and second main faces;
a second transparent glazing, with third and fourth main faces;
a lamination interlayer made of thermoplastic polymer material, a majority of the second main face and a majority of the third main face makes adhesive contact with the lamination interlayer, and the laminated glazing comprising, between the second and third main faces:
an electrically controllable device, including a support having a thickness e2, which support has a front face, a back face and an edge face, the front face bearing in a functional zone,
an electrically controllable system having, a thickness e'2, and the front face optionally including an electrical power supply zone adjacent to the functional zone, the electrically controllable device having an area smaller than a surface area of the lamination interlayer;
on the back face, a polymer connecting element, which is a thermoplastic strip having a thickness e3 of at most 0.3 mm, making adhesive contact with the back face and with one of the second and third main faces, then referred to as a contact face, the connecting element having an area smaller than a surface area of the lamination interlayer, the device being in a region of the glazing;
and/or on the front surface, another polymer connecting element, which is another thermoplastic strip having a thickness e'3 of at most 0.3 mm, making adhesive contact with the front surface and with one of the second and third main faces, then referred to as a bonding face, the other connecting element having an area smaller than a surface area of the lamination interlayer.

16. The glazing with an electrically controllable device as claimed in claim 15, wherein the thermoplastic strip is based namely on poly(vinyl butyral) (PVB) containing less than 15% plasticizer by weight, and said lamination interlayer is based on poly(vinyl butyral) (PVB) and/or the other thermoplastic strip is based on poly(vinyl butyral) (PVB) containing less than 15% plasticizer by weight.

17. The glazing with an electrically controllable device as claimed in claim 15, wherein the contact face is bare or coated with said layer, and/or the bonding face is bare or coated with said layer.

18. The glazing with an electrically controllable device, in particular for a vehicle, as claimed in claim 15, wherein said thermoplastic strip protrudes from the back face on at least one side and even on two sides, makes adhesive contact with the lamination interlayer and/or said other thermoplastic strip protrudes from the front surface and makes adhesive contact with the lamination interlayer.

19. The glazing with an electrically controllable device as claimed in claim 15, wherein the electrically controllable system is chosen from:
   a capacitive or inductive control switch, an antenna;
   one or more (opto)electronic components;
and wherein:
   i) the thermoplastic strip and the lamination interlayer make adhesive contact with the front face of the support, the optional other thermoplastic strip is between the interlayer and the bonding face and covers the one or more openings;
   or m) the other thermoplastic strip is on the electrically controllable device without the thermoplastic strip, and the lamination interlayer makes adhesive contact with the back face.

20. The glazing with an electrically controllable device as claimed in claim 15, wherein the system is on the surface and is chosen from:
   a surface light system;
   a digital signage system;
   a liquid-crystal system, a light valve, or an electrochromic system;
and i) said thermoplastic strip is on the electrically controllable device without the other thermoplastic strip;
or j) the other thermoplastic strip is on the electrically controllable device without the thermoplastic strip;
or k) said thermoplastic strip is on the electrically controllable device.

21. The glazing with an electrically controllable device, for a vehicle, as claimed in claim 15, wherein the lamination interlayer is made of poly(vinyl butyral) (PVB), which is optionally:
   acoustic;
   optionally with metal wires;
   or else forming a composite PVB/functional plastic film element or first PVB/functional plastic film/second PVB composite element.

22. A vehicle including at least one glazing with an electrically controllable device as claimed in claim 15.

* * * * *